(12) United States Patent
Ogura

(10) Patent No.: US 8,640,102 B2
(45) Date of Patent: Jan. 28, 2014

(54) REMOVAL OF PROGRAM LICENSED TO USER

(75) Inventor: Yoshihiro Ogura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 180 days.

(21) Appl. No.: 13/180,862

(22) Filed: Jul. 12, 2011

(65) Prior Publication Data

US 2012/0017199 A1    Jan. 19, 2012

(30) Foreign Application Priority Data

Jul. 16, 2010 (JP) .................................. 2010-161896

(51) Int. Cl.
| | | |
|---|---|---|
| *G06F 21/00* | (2013.01) | |
| *G06F 15/173* | (2006.01) | |
| *G06F 15/16* | (2006.01) | |
| *H04L 29/06* | (2006.01) | |
| *G06F 11/30* | (2006.01) | |
| *G06F 9/44* | (2006.01) | |
| *G06F 7/04* | (2006.01) | |
| *G06F 17/30* | (2006.01) | |

(52) U.S. Cl.
USPC ............... 717/124; 705/51; 705/59; 709/223; 709/229; 713/150; 713/156; 713/188; 717/168; 717/177; 726/5; 726/26; 726/31

(58) Field of Classification Search
None
See application file for complete search history.

(56) References Cited

U.S. PATENT DOCUMENTS

| | | | |
|---|---|---|---|
| 7,072,672 B1 | 7/2006 | Vanska et al. | |
| 2003/0005135 A1* | 1/2003 | Inoue et al. | 709/229 |
| 2003/0084306 A1* | 5/2003 | Abburi et al. | 713/188 |
| 2005/0114267 A1* | 5/2005 | Miwa et al. | 705/59 |
| 2005/0278716 A1* | 12/2005 | Koppen et al. | 717/168 |
| 2006/0021012 A1* | 1/2006 | Ito | 726/5 |
| 2008/0005029 A1* | 1/2008 | Ando | 705/51 |

(Continued)

FOREIGN PATENT DOCUMENTS

| | | |
|---|---|---|
| CN | 101253508 A | 8/2008 |
| EP | 1 965 330 | 9/2008 |

(Continued)

OTHER PUBLICATIONS

Nathaniel S. Good et al., Noticing Notice: A Large-Scale Experiment on the Timing of Software License Agreements, 2007, [Retrieved on Aug. 22, 2013]. Retrieved from the internet: <URL: http://dl.acm.org/citation.cfm?id=1240720> 10 Pages (607-616).*

(Continued)

*Primary Examiner* — Don Wong
*Assistant Examiner* — Anibal Rivera
(74) *Attorney, Agent, or Firm* — IPUSA, PLLC

(57) ABSTRACT

An image forming apparatus includes a program storing unit, a function introducing unit to obtain a program licensed to an individual user and license information about the program from an external source and to store the program in the program storing unit, a user information storing unit to store user information that includes the license information about the program that is stored by the function introducing unit, the license information being associated with a user ID of the individual user in the user information, a removal timing receiving unit to receive a setting of removal timing at which the program stored by the function introducing unit is removed from the program storing unit, and a removal unit to remove the program stored by the function introducing unit from the program storing unit upon arrival of the removal timing received by the removal timing receiving unit.

20 Claims, 41 Drawing Sheets

(56) References Cited

U.S. PATENT DOCUMENTS

| | | | |
|---|---|---|---|
| 2008/0046720 A1* | 2/2008 | Sugishita et al. | 713/156 |
| 2008/0244057 A1* | 10/2008 | Kojima | 709/223 |
| 2009/0113485 A1* | 4/2009 | Inukai | 725/58 |
| 2009/0151006 A1 | 6/2009 | Saeki et al. | |
| 2010/0251232 A1* | 9/2010 | Shinomiya | 717/177 |
| 2010/0251382 A1* | 9/2010 | Goto et al. | 726/26 |
| 2010/0293622 A1* | 11/2010 | Nikitin et al. | 726/31 |
| 2011/0093695 A1* | 4/2011 | Pavan et al. | 713/150 |

FOREIGN PATENT DOCUMENTS

| | | |
|---|---|---|
| JP | 2007-053557 | 3/2007 |
| JP | 2007-053558 | 3/2007 |
| JP | 2008-047056 | 2/2008 |

OTHER PUBLICATIONS

Extended European Search Report dated Aug. 31, 2011.
Chinese Office Action dated Oct. 8, 2013.

* cited by examiner

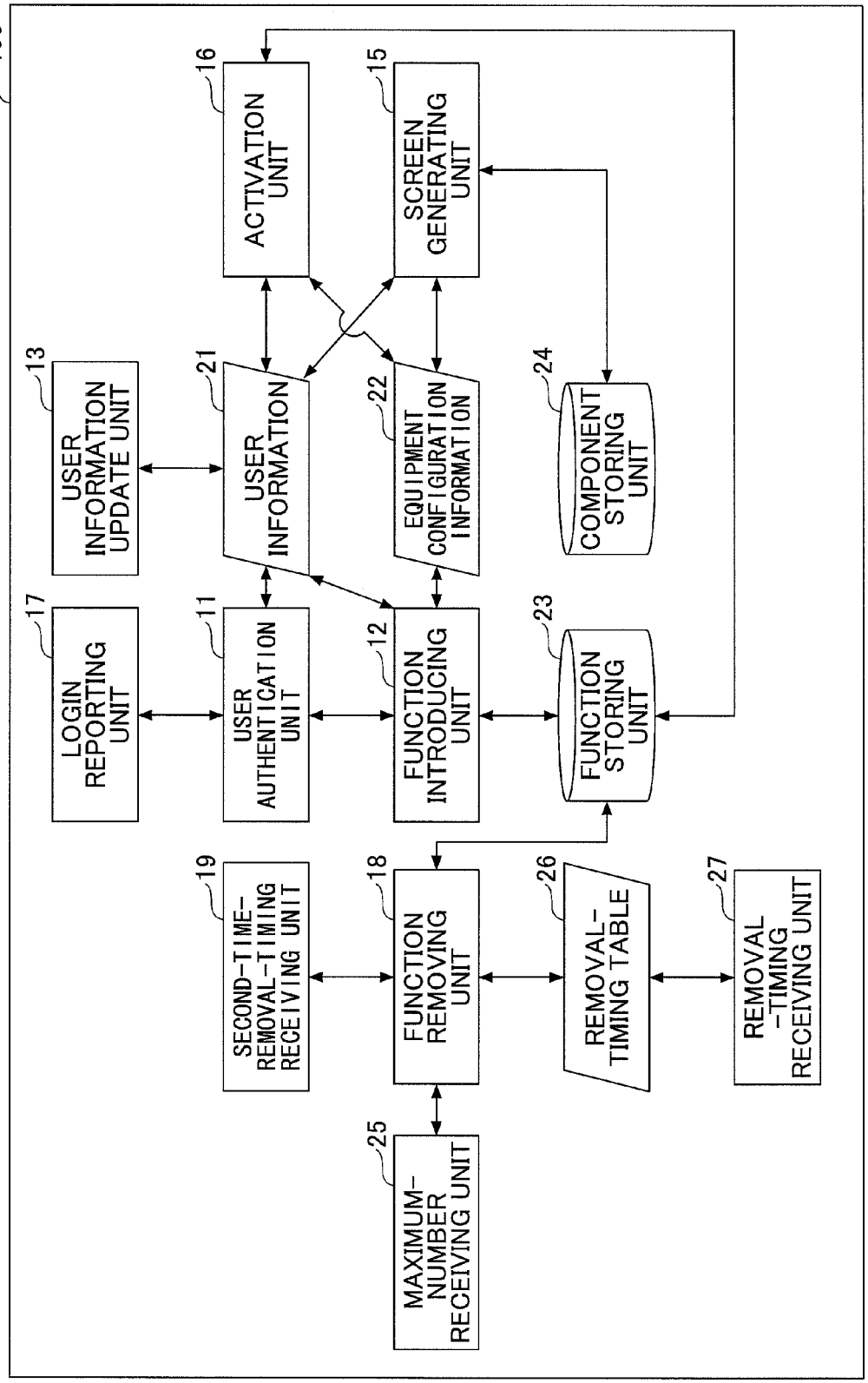

FIG.5A

USER INFORMATION 21

| USER ID | PASSWORD | LINKED LICENSE INFORMATION |
|---|---|---|
| aaaa | 12345 | — |
| bbbb | xyzxyz | XX FUNCTION |
| cccc | 1357abc | XX FUNCTION |
|  |  | ZZ FUNCTION |
| dddd | justjust | — |

FIG.5B

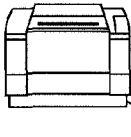

EQUIPMENT CONFIGURATION INFORMATION 22

| FUNCTION | LICENSE TYPE |
|---|---|
| α | LINKED LICENSE |
| β | LINKED LICENSE |
| γ | —(DEFAULT) |
| Σ | NORMAL LICENSE |

FIG.5C

MANAGEMENT INFORMATION

| USER ID | PASSWORD | (LINKED LICENSE INFORMATION) |
|---|---|---|
| USER aaaa | 12345 | — |
| USER bbbb | xyzxyz | XX FUNCTION |
| USER cccc | 1357abc | XX FUNCTION |
|  |  | ZZ FUNCTION |
| USER dddd | justjust | — |
| USER eeee | 24680 | YY FUNCTION |
| USER ffff | imaima | — |
| USER gggg | oomori | VV FUNCTION |
| USER hhhh | azamino | — |

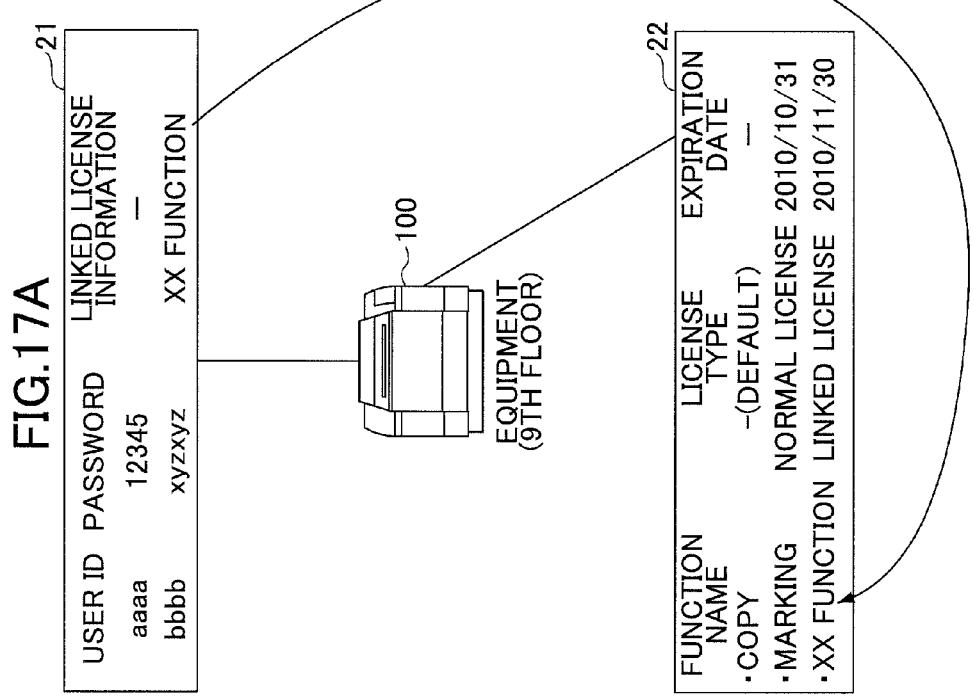
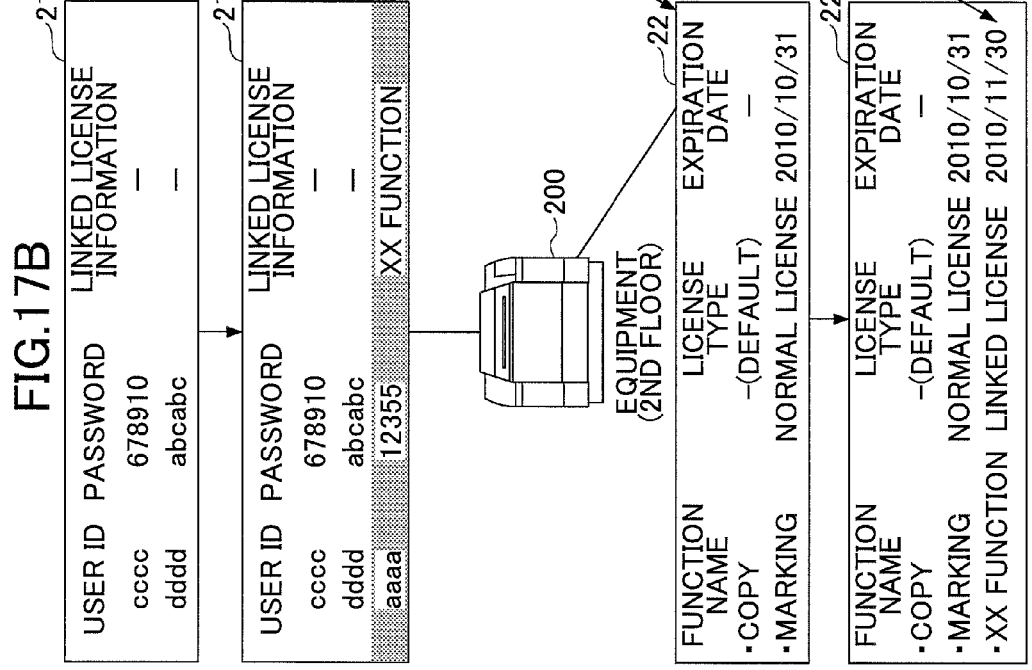
FIG.17A / FIG.17B

FIG.21

| LINKED LICENSE INFORMATION | REMOVAL TIMING | USER ID |
|---|---|---|
| XX FUNCTION | 0:00 AM ON 5/19 | USER bbbb |
| | 0:00 AM ON 5/21 | USER pppp |
| | NOT TO BE REMOVED | USER dddd |

FIG.24A

| LINKED LICENSE INFORMATION | REMOVAL TIMING | USER ID |
|---|---|---|
| XX FUNCTION | 0:00 AM ON 5/19 | USER bbbb |

FIG.24B

| LINKED LICENSE INFORMATION | REMOVAL TIMING | USER ID |
|---|---|---|
|  | (0:00 AM ON 5/19) | (USER bbbb) |
| XX FUNCTION | 0:00 AM ON 5/21 | USER pppp |

FIG.24C

| LINKED LICENSE INFORMATION | REMOVAL TIMING | USER ID |
|---|---|---|
| XX FUNCTION | (0:00 AM ON 5/19) | (USER bbbb) |
|  | (0:00 AM ON 5/21) | (USER pppp) |
|  | NOT TO BE REMOVED | USER dddd |

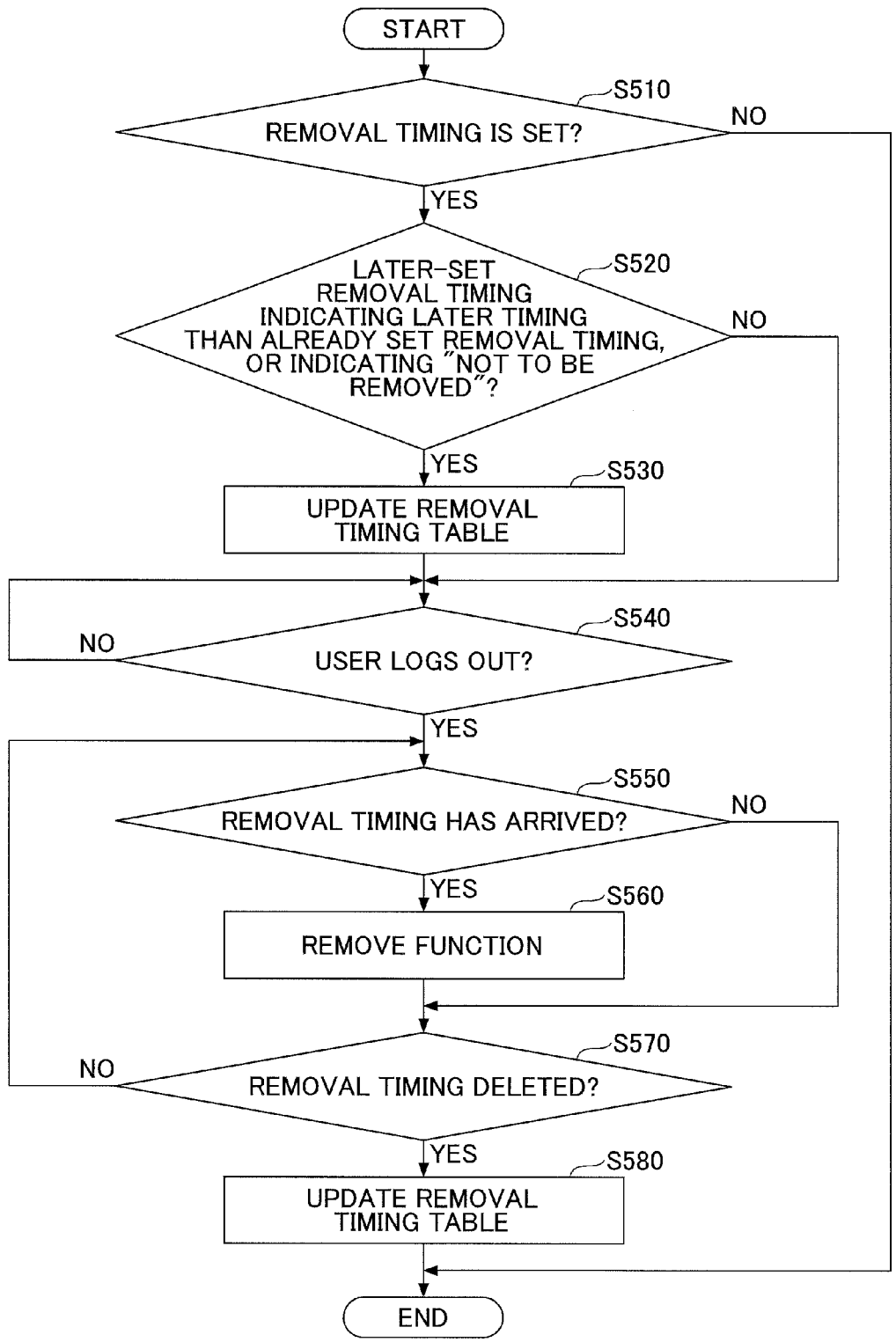

FIG.27

| LINKED LICENSE INFORMATION | REMOVAL TIMING | USER ID |
|---|---|---|
| XX FUNCTION | 0:00 AM ON 5/19 | USER bbbb |
| | MAXIMUM NUMBER=10: NUMBER OF ACTIVATIONS AT PRESENT= 3 | USER pppp |
| | UPON NEXT ACTIVATION | USER eeee |
| | ASSOCIATED WITH USER INFORMATION | USER ffff |

| USER ID | PASSWORD | LINKED LICENSE INFORMATION | REMOVAL PROHIBITED |
|---|---|---|---|
| USER aaaa | 12345 | — | |
| USER bbbb | xyzxyz | XX FUNCTION | |
| USER cccc | 1357abc | XX FUNCTION | |
| | | ZZ FUNCTION | |
| USER dddd | justjust | ZZ FUNCTION | ON |

FIG.40

| FUNCTION | LICENSE TYPE | DATE LAST ACTIVATED | DATE AND TIME OF INTRODUCTION | FREQUENCY OF USE OVER PREVIOUS ONE YEAR | TEMPORAL INTRODUCTION |
|---|---|---|---|---|---|
| α | –(DEFAULT) | 2010/01/01 | | | – |
| β | LINKED LICENSE | 2010/05/01 | 2010/05/01 | 10 | ※ |
| γ | LINKED LICENSE | 2010/03/01 | 2009/12/01 | 6 | ※ |
| Σ | NORMAL LICENSE | 2010/03/01 | | | – |

~22

REMOVAL OF PROGRAM LICENSED TO USER

BACKGROUND OF THE INVENTION

1. Field of the Invention

The disclosures herein generally relate to image forming apparatuses to which a program licensed to a user is installed, and particularly relate to an image forming apparatus, an equipment system, a program management method, and a program which manages and controls timing for deleting an installed function.

2. Description of the Related Art

Equipment items such as a copier, a scanner, a printer, a FAX, and a multifunctional machine (also referred to as an MFP) provided with the functionalities of these are provided with an embedded information processing apparatus. The performance of a CPU usable for such an information processing apparatus has been increasing. Also, a large volume memory has become available at low price.

Further, networking has been growing as the mode of use of such equipment items. In place of storing an application in an equipment item in advance for sales, an alternative mode of sales has been becoming available in which a user purchases an application according to need, and downloads the application via a network to install the program.

The installment of an application to equipment items is managed and controlled according to whether there is a license (use authorization), thereby preventing unauthorized use. The substance of the license is a license key that is given to a user at the time of legitimate purchase of an application. The user enters the license key at the time of installment, thereby being allowed to install the application to the equipment.

Information regarding equipment items having use authorization may be registered in a license server to manage and control licenses. In such a case, a user installs an application, and, then, accesses the license server at the time of use thereby to request the license server to perform license authentication. Upon successful authentication, the user can use the application in the equipment.

In such license management, however, a target that is authenticated is only an equipment item (i.e., the serial code unique to the equipment) to which an application is installed.

In contrast, there is another type of licensing called a floating license by which the presence/absence of a license is managed and controlled by the number of installed applications. In the floating license, the maximum number of licenses is determined in advance at the time of entering into a license contract. As long as the number of applications does not exceed the maximum license number, the application can be installed to plural equipment items without limiting installment targets to specific equipment items.

Under some circumstances, it may be preferable to manage and control the license on an individual-specific basis rather than on an equipment item-specific basis or by use of a maximum license number. In an example of an image forming apparatus, such a circumstance may correspond to a case in which an individual user purchases an application (i.e., utility) made by a third-party vendor to install the application in an equipment item that the user uses in his/her office. Neither an organization nor a department has purchased the application, but an individual user has purchased and installed the application. Only this user may properly be allowed to use the application. Hereinafter, a user-specific application license is referred to as a user-linked license.

Applications that may be purchased by an individual user range from a simple calculator and various types of gadgets for providing some functions, to applications for modifying a screen, an operation flow, or the like into an individually registered unique content to provide modified appearance or better operability.

In the case of an application that requires an individual-specific license, a user may wish to use the application not only in the equipment in which the application has been installed but also in other equipment that the user may use. For example, the user may attend to work during a business trip or attend to work temporarily in a floor different from his floor. In such a case, with the license management performed on an equipment item-specific basis, the user may need to remove the corresponding function (i.e., return the license) from the equipment in which the application has been installed, and, then, newly install the application in the equipment that the user is temporarily using.

SUMMARY OF THE INVENTION

It is a general object of at least one embodiment of the present invention to provide an image forming apparatus that substantially eliminates one or more problems caused by the limitations and disadvantages of the related art.

In one embodiment, an image forming apparatus, in which an activation of a program providing a function is allowed according to license information indicating that a user activating the program is authorized to activate the program, includes: a login accepting unit to accept a user login; a program storing unit to store a program; a function introducing unit to obtain a given program licensed to an individual user and license information about the given program from an external source and to store the given program in the program storing unit; a user information storing unit to store user information that includes the license information about the given program that is stored by the function introducing unit, the license information being associated with a user ID of the individual user in the user information; a removal timing receiving unit to receive a setting of removal timing at which the given program stored by the function introducing unit is removed from the program storing unit; and a removal unit to remove the given program stored by the function introducing unit from the program storing unit upon arrival of the removal timing received by the removal timing receiving unit.

According to at least one embodiment, an image forming apparatus, an equipment system, a program management method, and a program are provided that can control the timing for removing an application in a license type that manages and controls licenses on an individual-specific basis.

BRIEF DESCRIPTION OF THE DRAWINGS

Other objects and further features of embodiments will be apparent from the following detailed description when read in conjunction with the accompanying drawings, in which:

FIG. 4 is a block diagram illustrating an example of functions of the image forming apparatus;

FIGS. 5A through 5C are drawings illustrating an example of user information;

FIGS. 17A and 17B are drawings illustrating the states of equipment items;

FIG. 21 is a drawing illustrating an example of a removal-timing table;

FIGS. 24A through 24C are drawings illustrating examples of a removal-timing table;

FIG. 25 is a flowchart illustrating the procedure performed by a function removing unit to automatically remove an automatically introduced function;

FIG. 27 is a drawing illustrating an example of a removal-timing table;

FIG. 40 is a drawing illustrating an example of equipment configuration information.

DESCRIPTION OF THE PREFERRED EMBODIMENTS

In the case of individual-specific license management, arrangement may be made such that at the time of a login (i.e., identifying action) by a user, a license server identifies an application for which the license is given to the login user, thereby immediately installing the application in the equipment to which the user has logged in (see Patent Document 1: Japanese Patent Application Publication No. 2008-047056).

Patent Document 1 discloses an application management method that checks whether there is a license linked to a user at the time of user login, and that downloads and installs an application in the equipment to which the user has logged in when there is an application for which the user has a license.

The technology disclosed in Patent Document automatically removes the application downloaded from another equipment item after the user finishes using it. With such an arrangement, it is inconvenient for the user to be unable to adjust the timing at which the application is removed. When the application is automatically removed after the user logs out upon finishing using it, the installment and removal actions may be performed repeatedly if the user frequently uses the equipment over some period of time even though such use is temporary.

In some cases, the application installed by a user who has logged in for temporary use may also have been licensed to another user who registered the application in the equipment in advance (e.g., linking the user with the license has been completed upon the purchase of the license but the application has not yet been installed).

In such a case, the application should stay installed and should not be removed from the viewpoint of the user who registered the application in the equipment in advance. Namely, the need to install the application again upon the registered user logging in to the equipment may lower the operability and work efficiency with the arrangement that automatically removes the application upon a logout.

In the following, modes for carrying out the present invention will be described by referring to embodiments with reference to the accompanying drawings.

Figure 1:
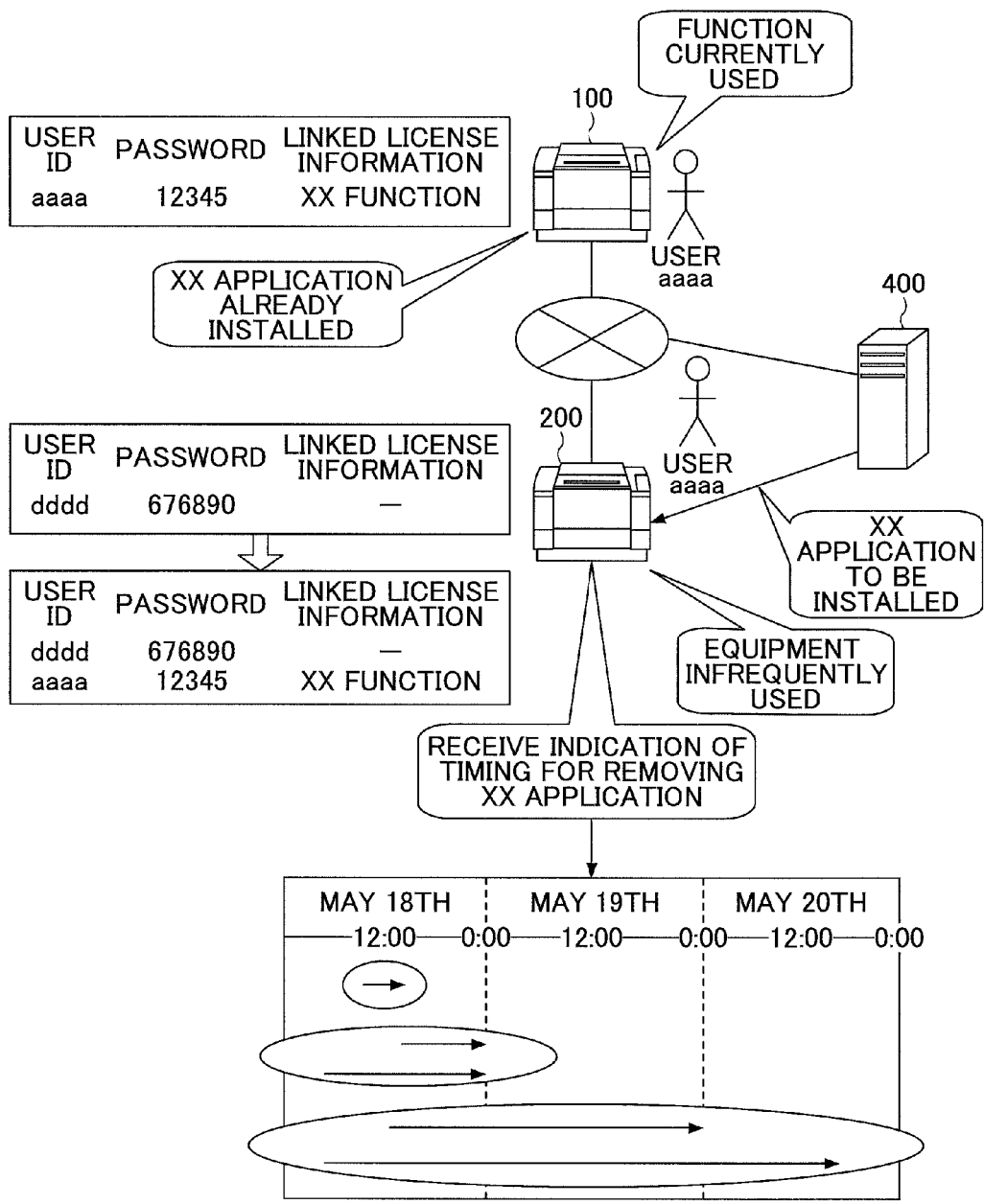
FIG. 1 is a drawing illustrating the outline of installment and removal of an application with respect to equipment.

FIG. 1 is a drawing illustrating the outline of installment and removal of an application with respect to equipment item 200. A user aaaa routinely uses an equipment item 100, and temporarily uses the equipment item 200. The equipment item 100 and the equipment item 200 are electrically connected to a license server 400.

(1) The user aaaa has a linked license "XX function" which is licensed to the user aaaa. The "XX function" is a license that indicates that the user aaaa has the right to use an "XX application." Even though the XX application is installed in the equipment item 100, users other than the user aaaa cannot use the XX application.

(2) When the user aaaa logs in to the equipment item 200 as such a need arises, the equipment item 200 transmits the user ID of the user aaaa to the license server 400 to inquire whether a linked license exists. The license server 400 notifies the equipment item 200 that the user aaaa has the linked license "XX function".

(3) The equipment item 200 obtains the XX application and license information about the XX function from the license server 400 for installment. With this arrangement, the user aaaa can automatically use the function for which the linked license is given, upon using the equipment item 200 connected to the license server 400.

(4) The equipment item 200 of the present embodiment receives, from the user aaaa, a setting indicative of the timing for removing the XX application. This may be done at the time of installing the XX application, after the installment, or after the user finishes using the application. This is one of the features of the equipment item 200.

The user aaaa can make a setting indicative of desired removal timing to the equipment item 200 such as removal upon a logout, removal at the time of date change, removal at a specified date and time, etc. In FIG. 1, the right-hand-side end of an ellipse indicates the removal timing set by the user, so that the user can use the XX application during the period corresponding to the length of the ellipse.

In the manner described above, the equipment item 100 of the present embodiment allows a user to set the timing for removing a function that is usable on a user-specific basis by using a linked license that the user personally has.

Here, the definitions of terminologies used in the present embodiment will be provided.

A "function" is a function provided by (i.e., performed by) an application. In this disclosure, a "function" may sometimes be used to mean the same thing as an "application". Introduction of a function refers to an action that causes the function to be able to be used by the user in the equipment item 100. Introduction substantially means the same thing as installment and activation, and refers to only activation when installment has already been performed. Activation refers to an action by which the possession of legitimate license is confirmed thereby to allow the use of the application.

Applications may be various programs. Applications include utility software such as a calculator, an electronic calendar, a schedule table, and so on, screen modify software for modifying screen colors and icon arrangements as specified, control-purpose software for making pre-registered settings to the equipment item 100 about print conditions, scan conditions, FAX recipients, and the like, and basic function software for providing a copy function, a scanner function, a FAX function, etc.

The term "linked license" refers to a type of license that allows a user to use the function rather than an equipment item to use the function. The term "linked license information" refers to a substance (e.g., license key) of a linked license. In the present embodiment, the linked license information also specifies the name of the function. In contrast, a type of license that allows an equipment item to use the function is referred to as a "normal license". There are functions that a user does not need to purchase aside from the equipment. Such functions are referred to as "default" functions (for which no license information is given).

With only an application per se, the user cannot activate the application. Only after linked license information associated with the application is registered in an equipment item, can the user activate the application. It becomes possible to introduce the function when the linked license information is accessible.

<Overall Configuration>

Figure 2:
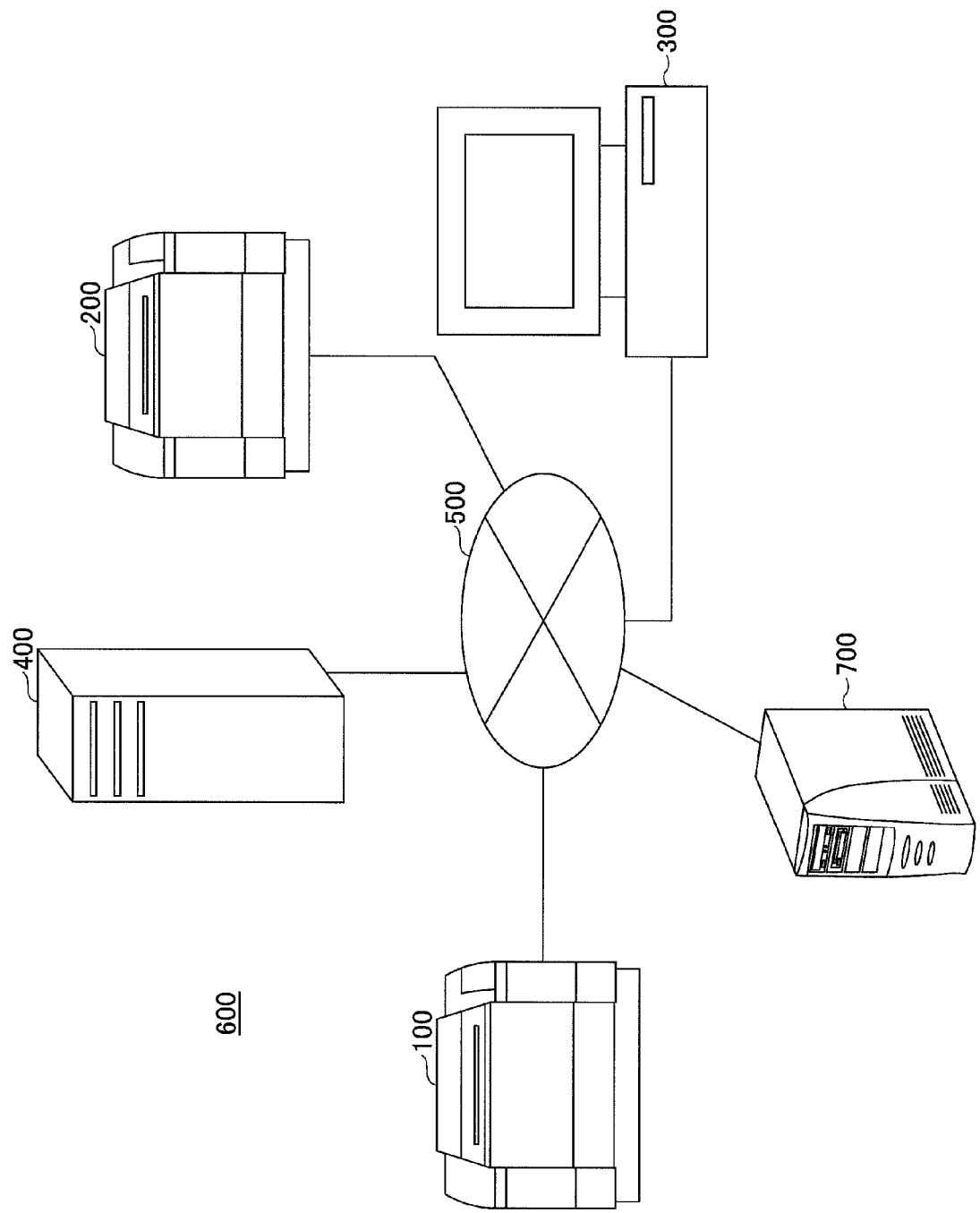
FIG. 2 is a drawing illustrating an example of an equipment system.

FIG. 2 is a drawing illustrating an example of an equipment system 600. The equipment item 100 and equipment item 200 are connected to a sales server 300, the license server 400, and a management server 700 via a network 500. The equipment items 100 and 200 are provided with one or more functions such as a printer function, a scanner function, and a FAX function. Such equipment is sometimes referred to as an MFP (Multifunction Peripheral). The equipment item 200 to which a user temporarily logs in may include features of the present embodiment. The equipment item 100 may have the same functions as the equipment item 200. Namely, although the equipment item 100 and the equipment item 200 may be described as different equipment items for the sake of convenience of explanation, they have equivalent functions.

The sales server 300 serves to sell functions to users and the equipment item 100. The license server 400 serves to manage and control functions licensed to users. For the sake of simplicity of explanation, the license server 400 is described as a server that plays a role of introducing a function to the equipment item 100 to which a user has logged in. Alternatively, the server that stores functions may be separate from the license server 400. The management server 700 manages and controls users. The management server 700 manages and controls user IDs and passwords of all the users using the equipment system 600.

The equipment item 200 is temporarily used by a user to use a function. Such a function is automatically introduced to the equipment item 200, so that the user can use the purchased function not only in the equipment item 100 but also in the equipment item 200. In this regard, a linked license may be more effective than normal license. Since the equipment items 100 and 200 are provided with a computer, provision may be made such that these equipment items also serve as one or more of the sales server 300 and the license server 400.

The network 500 may be a LAN, a WAN (i.e., VLAN, VPN, etc.), or the Internet. The network 500 may be wireless or wired.

Figure 3:
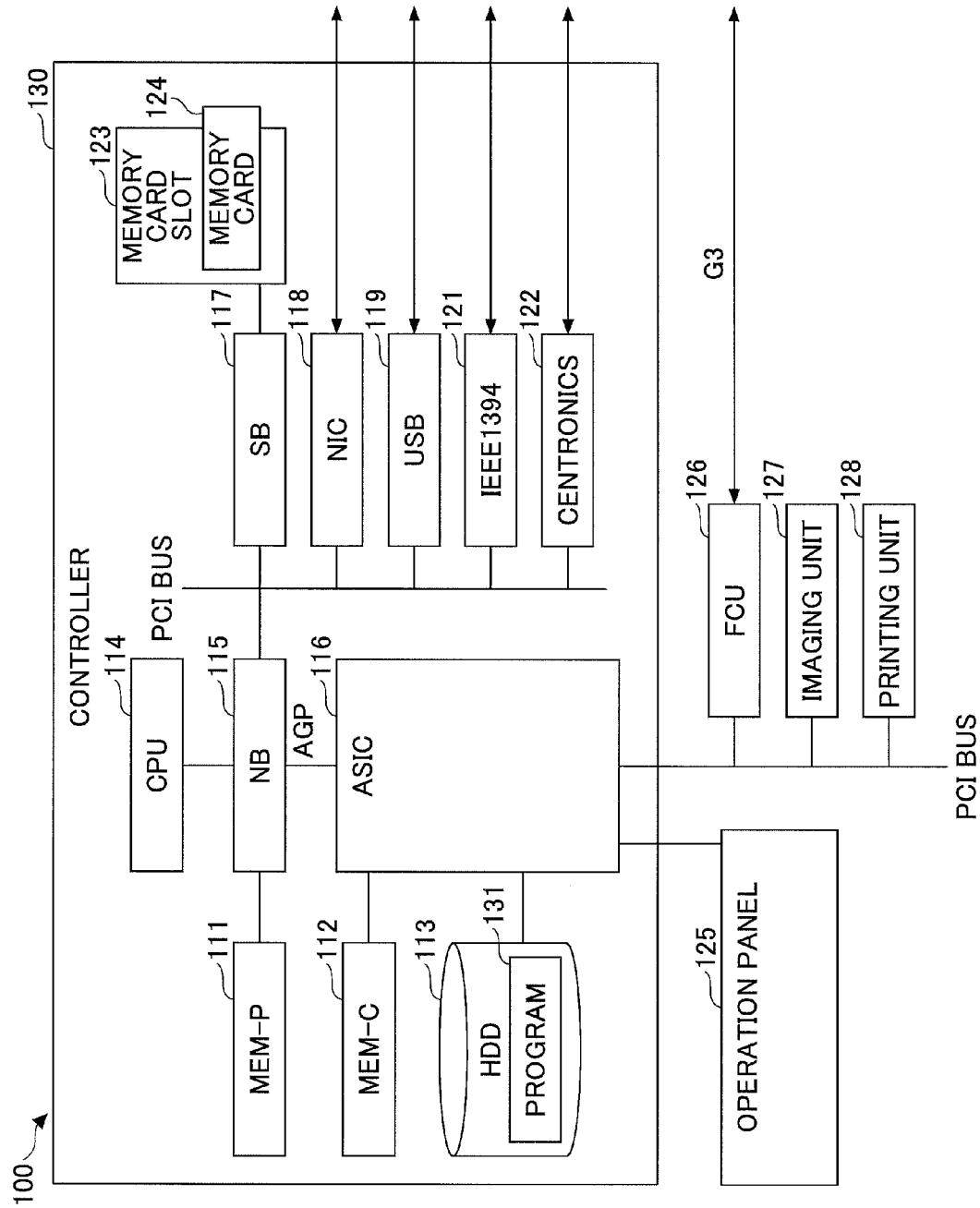
FIG. 3 is a drawing illustrating an example of the hardware configuration of an image forming apparatus.

FIG. 3 is a drawing illustrating an example of the hardware configuration of the equipment item 100. The hardware of the equipment item 100 includes a controller 130, an operation panel 125, a facsimile control unit (FCU) 126, an imaging unit 127, and a printing unit 128.

The controller 130 includes a CPU 114, an ASIC 116, an NB (north bridge) 115, an SB (south bridge) 117, an MEM-P (system memory) 111, an MEM-C (local memory) 104, an HDD (hard-disk drive) 113, a memory card slot 123, an NIC (network interface controller) 118, a USB device 119, an IEEE 1394 device 121, and a Centronics device 122.

The CPU 114 is an IC for performing various types of information processing, and executes applications, platforms, and option packages in parallel on a process-by-process basis based on an OS such as UNIX (registered trademark). The ASIC 116 is an IC for image processing. The NB 115 is the bridge that connects between the CPU 114 and the ASIC 116. The SB 117 is the bridge that connects between the NB 115 and peripheral devices. The ASIC 116 and the NB 115 are connected to each other via an AGP (Accelerated Graphics Port).

The MEM-P 111 is a memory connected to the NB 115. The MEM-C 112 is a memory connected to the ASIC 116. The HDD 113 is a storage connected to the ASIC 116, and is used to store image data, document data, programs, font data, form data, etc. The HDD 113 stores various types of applications and a program 131.

The memory card slot 123 is connected to the SB 117, and receives a memory card 124 set therein (i.e., inserted thereinto). The memory card 124 is a flash memory such as a USB memory, and may be used to distribute the program 131. Alternatively, the program 131 may be downloaded from a server to the equipment item 100.

The NIC 118 is a controller that performs data communication via the network 500 or the like by use of MAC addresses or the like. The USB device 119 serves to provide a serial port conforming to the USB specification. The IEEE 1394 device 121 serves to provide a serial port conforming to the IEEE 1394 specification. The Centronics device 122 serves to provide a parallel port conforming to the Centronics specification. The NIC 118, the USB device 119, the IEEE 1394 device 121, and the Centronics device 122 are connected to the NB 115 and the SB 117 via a PCI (Peripheral Component Interconnect) bus.

The operation panel 125 serves as the hardware unit (operation unit) by which a user enters an input into the equipment item 100, and also serves as the hardware unit (display unit) through which the equipment item 100 presents visual information to an operator. The operation panel 125 is connected to the ASIC 116. The FCU 126, the imaging unit 127, and the printing unit 128 are connected to the ASIC 116 via a PCI (Peripheral Component Interconnect) bus.

FIG. 4 is a drawing illustrating an example of the functional blocks of the equipment item 100. The equipment item 100 includes a user authentication unit 11, a function introducing unit 12, a user information update unit 13, a screen generating unit 15, an activation unit 16, a function removing unit 18, a removal-timing receiving unit 27, a maximum-number receiving unit 25, a login reporting unit 17, and a second-time-removal-timing receiving unit 19, all of which are implemented by the CPU 114 executing programs. The equipment item 100 further includes user information 21, equipment configuration information 22, and a removal-timing table 26 stored in the HDD 113 or the like, and also includes a function storing unit 23 and a component storing unit 24 that are implemented by use of the HDD 113.

In the following, each of the functional units will be briefly described. The user authentication unit 11 authenticates a user based on whether a combination of a user ID and a password entered by the user is found as a registered item in the user information 21. The function introducing unit 12 introduces a function from the license server 400 when the function licensed to a login user is not registered in the equipment item 200.

The user information update unit 13 communicates with the license server 400 to update linked license information in the user information 21.

The screen generating unit 15 retrieves an icon linked with a function from the component storing unit 24 to display the retrieved icon on the operation screen shown on the operation panel 125. The activation unit 16 automatically activates a function. The function removing unit 18 removes a function that has been introduced to the equipment item 200.

The removal-timing receiving unit 27 receives a setting of removal timing made by a user. The maximum-number receiving unit 25 receives a setting of the maximum number of storable functions that can be stored in the equipment system 600. The login reporting unit 17 performs multi-address transmission to send a login notification (i.e., user ID) indicating that a user has logged in to the equipment items in the equipment system 600. The second-time-removal-timing receiving unit 19 receives a setting of second-time removal timing in consideration of the possibility that the function removing unit 18 may fail to remove a function.

The function storing unit 23 serves to store functions (i.e., applications). The component storing unit 24 serves to store components such as icons and characters constituting an operating screen. The removal-timing table 26 stores removal timings on a function-specific basis.

[User Information]

FIG. 5A is a drawing schematically illustrating an example of the user information 21. In the user information 21, passwords and linked license information are registered and associated with respective user IDs.

User ID is unique identification information for identifying a user for the purpose of logging in to the equipment item 100.

A password is information used to authenticate a user. The user authentication unit 11 authenticates a user based on whether a combination of a user ID and a password entered by the user when logging in matches a registered combination of a user ID and a password associated with the user ID. It may be noted that passwords in the user information 21 are omitted from illustration in the subsequent drawings.

Linked license information is the name (i.e., license information) of a function that is licensed on a user-specific basis as previously described.

With a user ID and linked license information registered in advance, a user can activate the relevant function.

[Equipment Configuration Information 22]

FIG. 5B is a drawing schematically illustrating an example of the equipment configuration information 22. In the equipment configuration information 22, information about functions introduced to the equipment item 100 is registered.

License types are registered and associated with respective functions such as an α function, a β function, a γ function, a Σ function. As previously described, the indication "–(default)" for the license type indicates that a user does not need to purchase the corresponding function separately from the equipment item 100. The indication "normal license" indicates that the corresponding function is allowed to be used in the equipment on an equipment item-specific basis.

A check can be made, by referring to the equipment configuration information 22, as to whether a function has been introduced to the equipment. A function that has not been introduced may be introduced according to need.

[Management Information]

FIG. 5C is a drawing illustrating an example of management information managed and controlled by the management server 700. In the management information, a combination of a user ID and a password is registered for each of the users of the equipment system 600. The management information of the management server 700 is used to update the user information 21 by the equipment items 100 and 200.

In FIG. 5C, linked license information is also illustrated. It may be noted, however, that linked license information may not have to be registered in the management information. This is because linked license information can be easily obtained by the equipment item 100 asking the license server 400 by using a user ID as a key. With the management server 700 having linked license information, however, there is no need for the equipment item 100 to access the license server 400, thereby reducing a processing time.

[Purchase of Function and Update of License Management Information]

Figure 6:
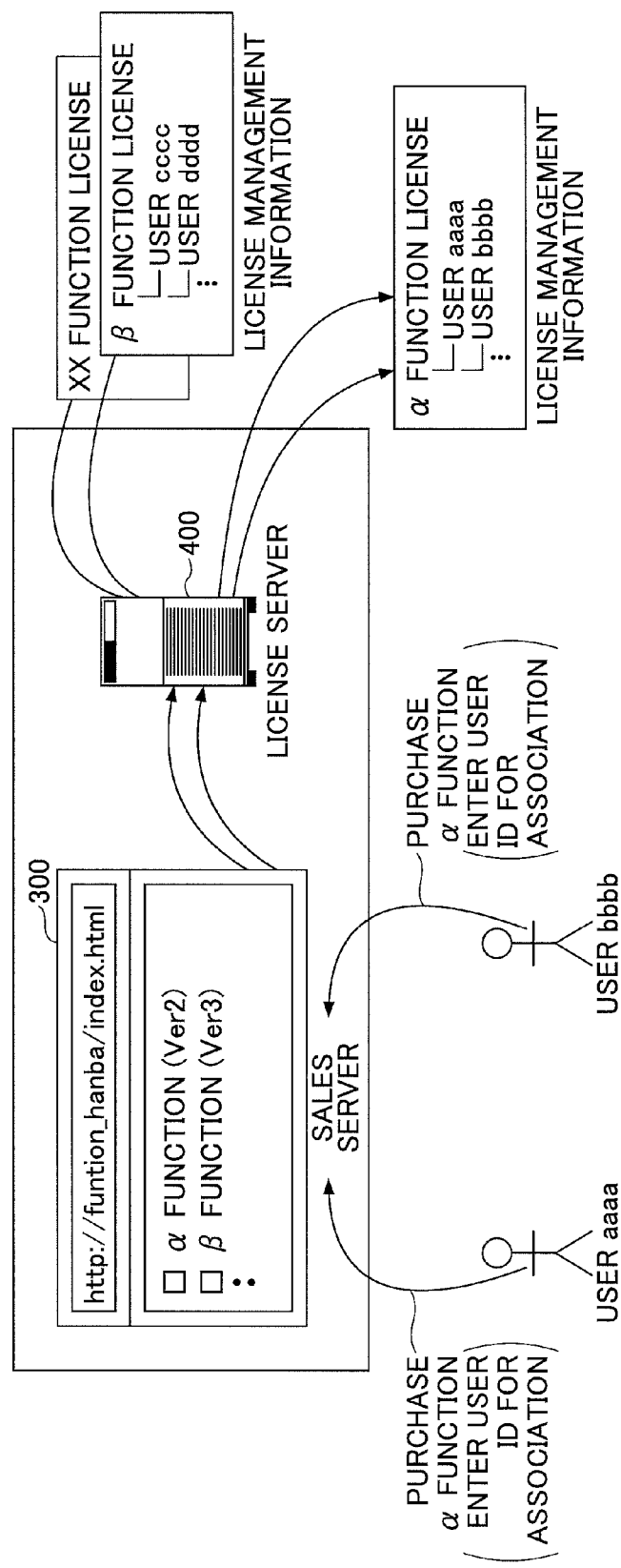
FIG. 6 is a drawing for explaining the acquisition of a license.

FIG. 6 is a drawing for explaining the acquisition of license. The user aaaa and the user bbbb activate browsers by operating PCs (personal computers: not shown) to access the sales server 300. The user aaaa and the user bbbb enter their respective user IDs to select functions that they wish to purchase from a list of functions such as an "α function" and a "β function".

The browsers receive a choice of a function, and transmit a user ID and the function name to the sales server 300. In FIG. 6, a non-limiting example is illustrated in which both the user aaaa and the user bbbb purchase the α function. The user aaaa and the user bbbb pay money by a predetermined payment method (an explanation of which will be omitted), thereby acquiring linked license information for the a function.

The current version of the α function is Version 2, so that the term "Ver2" is shown next to the "α function". In the present embodiment, the user who has purchased a linked license for a given function is allowed to use the function regardless of its version. There is thus no need to display a version. However, the displaying of a version as illustrated allows the user to know the version that the user is purchasing. When a later version of the function than the purchased version is released, the user is not required to pay an additional fee to use the function of this later version.

Upon selling a function to a user, the sales server 300 transmits the name of the sold function and the user ID to the license server 400. The license server 400 manages and controls license management information. The license management information is configured such that user IDs are associated with each function. In FIG. 6, the user aaaa and the user bbbb are registered for the function.

By referring to the license management information, the license server 400 can identify all the functions linked to a user upon the user ID (or any other information linkable to a login action) being identified. Different from normal license in which a function is licensed to the equipment item 100 or 200, there is no need to issue a license key from the license server 400 to a PC. This is because the inputting of a license key by a user is not necessary for the license server 400 to identify an equipment item. It suffices for the equipment item 100 to access the license server 400 at proper timing in order to introduce a licensed function.

In the following, a description will be given of a normal license by which a function is licensed to an equipment item will be given for comparison purposes. When a function is to be introduced to an equipment item that a user selects, the license server issues a license key upon purchase of the function from the sales server 300. The user uses the license key to perform an introduction process at the equipment to which the user wishes to introduce the function. At the time of introduction, equipment information (i.e., a serial ID or the like identifying the equipment) is transferred to the license server 400. The license server 400 can thus manage and control license keys in such a manner that the license keys are associated with equipment items (i.e., functions corresponding to the respective licenses have been introduced to the respective equipment items). Accordingly, even when a third party acquires a license key, the use of the application is prevented at any equipment other than the equipment having the serial number associated with the license key.

[Timing for Updating User Information 21]

License management information in the license server 400 is updated when a user purchases a function or when a user loses a license. Upon such an event, the equipment item 100 needs to update linked license information in the user information 21.

Figure 7:
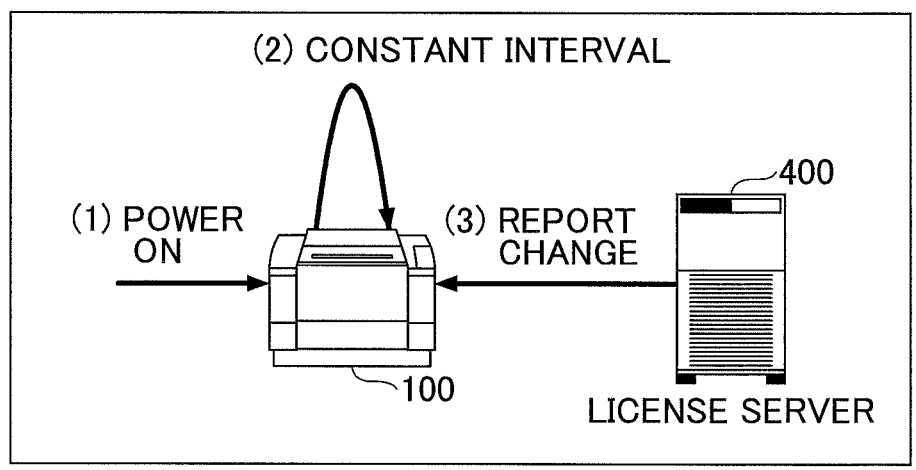
FIG. 7 is a drawing illustrating the timing at which the image forming apparatus updates linked license information in the user information.

FIG. 7 is a drawing illustrating the timing at which the equipment item 100 updates linked license information in the user information 21. This timing includes the following three timings:

(1) immediately after the power of the equipment item 100 is turned on;
(2) at constant intervals during the power-on state; and
(3) at the time a notice of a change in the license management information is received from the license server 400.

One or more of the timings (1) through (3) are set in the equipment item 100. The equipment item 100 detects an arrival of the timing indicated by the setting thereby to access the license server 400.

Figure 8:
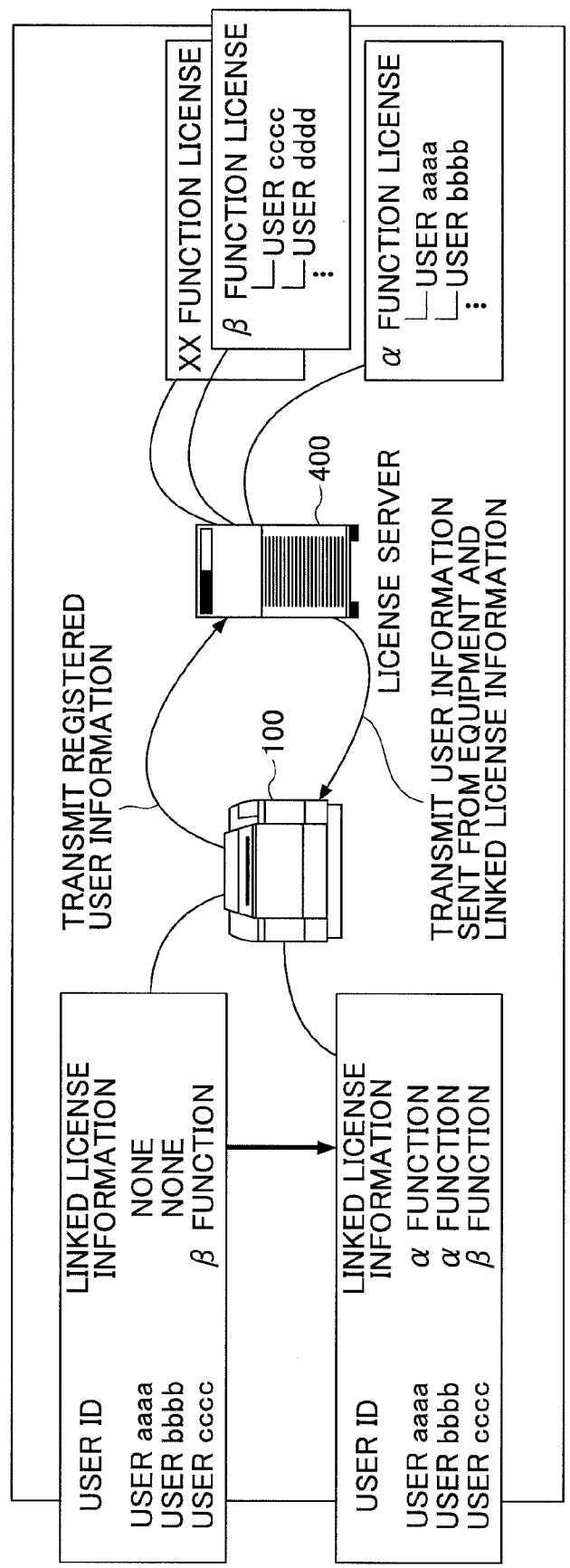
FIG. 8 is a drawing illustrating an example of the procedure performed by the image forming apparatus to update user information.

FIG. 8 is a drawing illustrating an example of the procedure performed by the equipment item 100 to update the user information 21. In the user information 21 of the equipment item 100 prior to update, there is no linked license information for the user aaaa and the user bbbb, and the linked license information for the user cccc is the "β function".

According to the license management information in the license server 400, on the other hand, the "α function" is linked to the user aaaa and the user bbbb. The equipment item 100 thus needs to update the user information 21.

Figure 9:
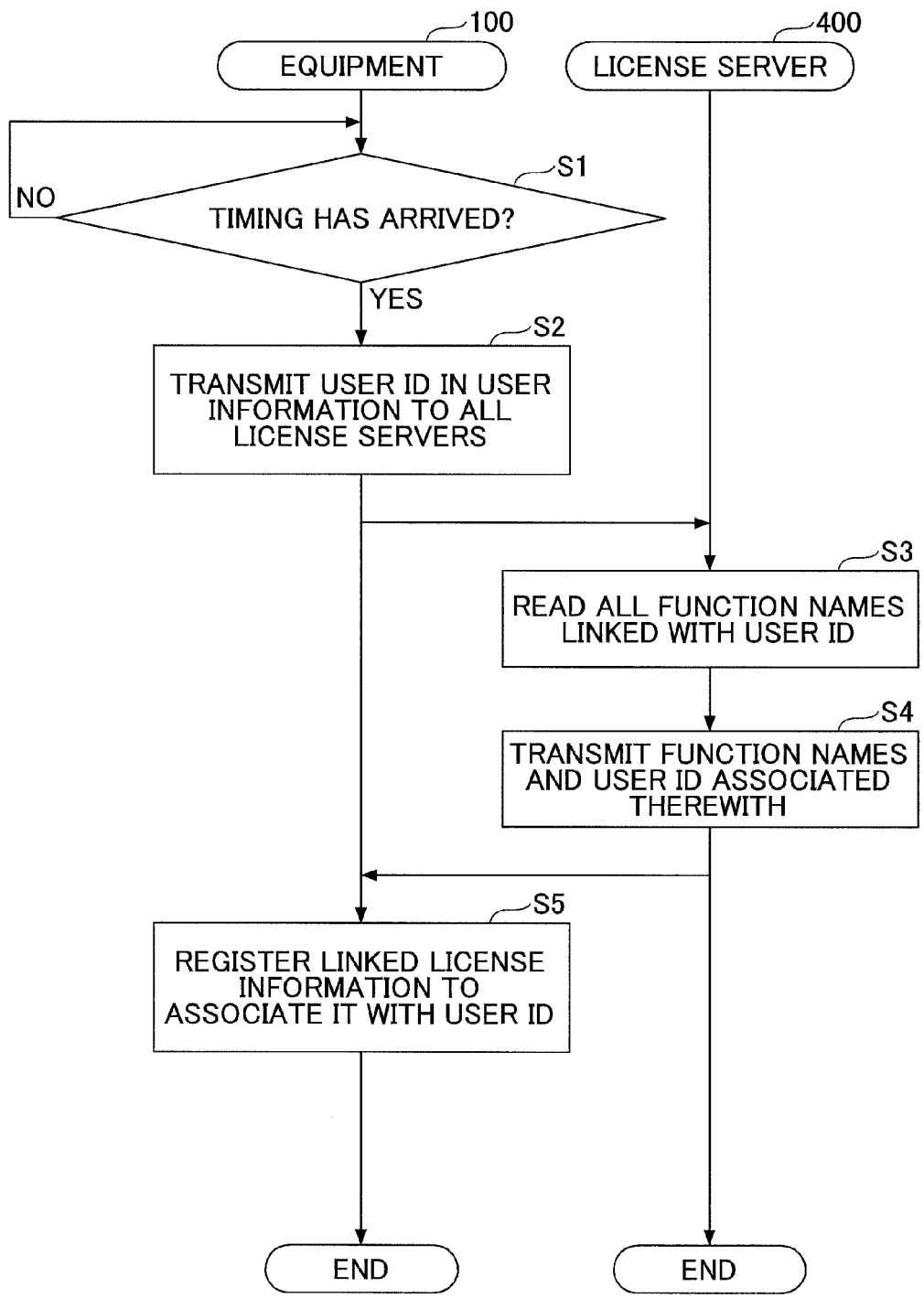
FIG. 9 is a flowchart illustrating an example of the procedure performed by a user information update unit to update the user information.

FIG. 9 is a flowchart illustrating an example of the procedure performed by the user information update unit 13 to update the user information 21.

The user information update unit 13 checks whether the timing indicated by the setting has arrived (step S1).

When the timing has arrived (Yes in S1), the user information update unit 13 transmits all the user IDs in the user information 21 to the license server 400 (S2).

The license server 400 reads all the functions linked with the user IDs (S3). For example, the α function, the α function, and the β function are read with respect to the user aaaa, the user bbbb, and the user cccc, respectively.

The license server 400 transmits the functions linked with the user IDs to the equipment item 100 (S4). It may be noted that plural functions (i.e., linked license information) may be associated with a single user ID as follows.

User aaaa: α function
: β function
User bbbb: α function
User cccc: β function
: γ function The user information update unit 13 registers the received functions in the user information 21 such that the functions are associated with the user IDs (S5).

For example, the user information update unit 13 registers the α function as linked license information such that this a function is associated with the user aaaa and the user bbbb. In this manner, the license information can be set with respect to the user aaaa and the user bbbb who have just purchased the function.

Since the β function is already registered as linked license information for the user cccc, the user information update unit 13 may do nothing for this information, or may overwrite this information.

In the manner as described above, linked license information can be registered with respect to the user IDs in the user information 21 at the equipment item 100.

[Automatic Introduction of Function]

There may be a case in which a function to be licensed as linked license has not yet been introduced in the equipment item 200 to which a user has logged in. In consideration of this, the equipment item 100 automatically introduces a function in response to a login action by a user. In order to automatically introduce a function, the equipment item 100 may need to be provided with the user information 21 about a login user. There are two types of mechanisms by which the equipment item 100 acquires (i.e., updates) the user information 21 as follows.

(1) When a user not registered in the user information 21 at the equipment item 100 requests to login, the equipment item 100 requests the management server 700 to provide a user ID and password of the user requesting to login. With this arrangement, the equipment item 100 can acquire the user ID and the password at the time of user login. Further, this arrangement can save resources at the equipment item 100.

(2) The equipment item 100 requests the management server 700 to provide user IDs and passwords at constant intervals. In this case, the equipment item 100 can have the same user IDs and passwords that the management server 700 has. When a user requests to login, thus, the equipment item 100 can start introducing a function without accessing the management server 700.

Which one of these mechanisms is used may be determined by an administrator. Regardless of which one of these mechanisms is used, the procedure for automatic introduction is the same. A description will be given of a case in which the mechanism (1) is chosen for the equipment item 200 in the present embodiment.

Figure 10:
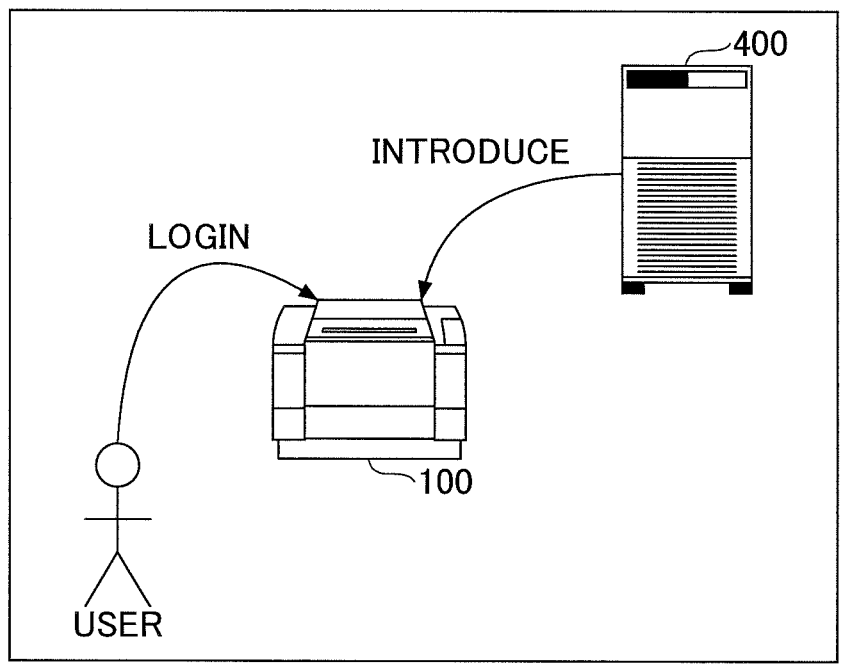
FIG. 10 is a drawing schematically illustrating the automatic introduction of a function.
Figure 11:
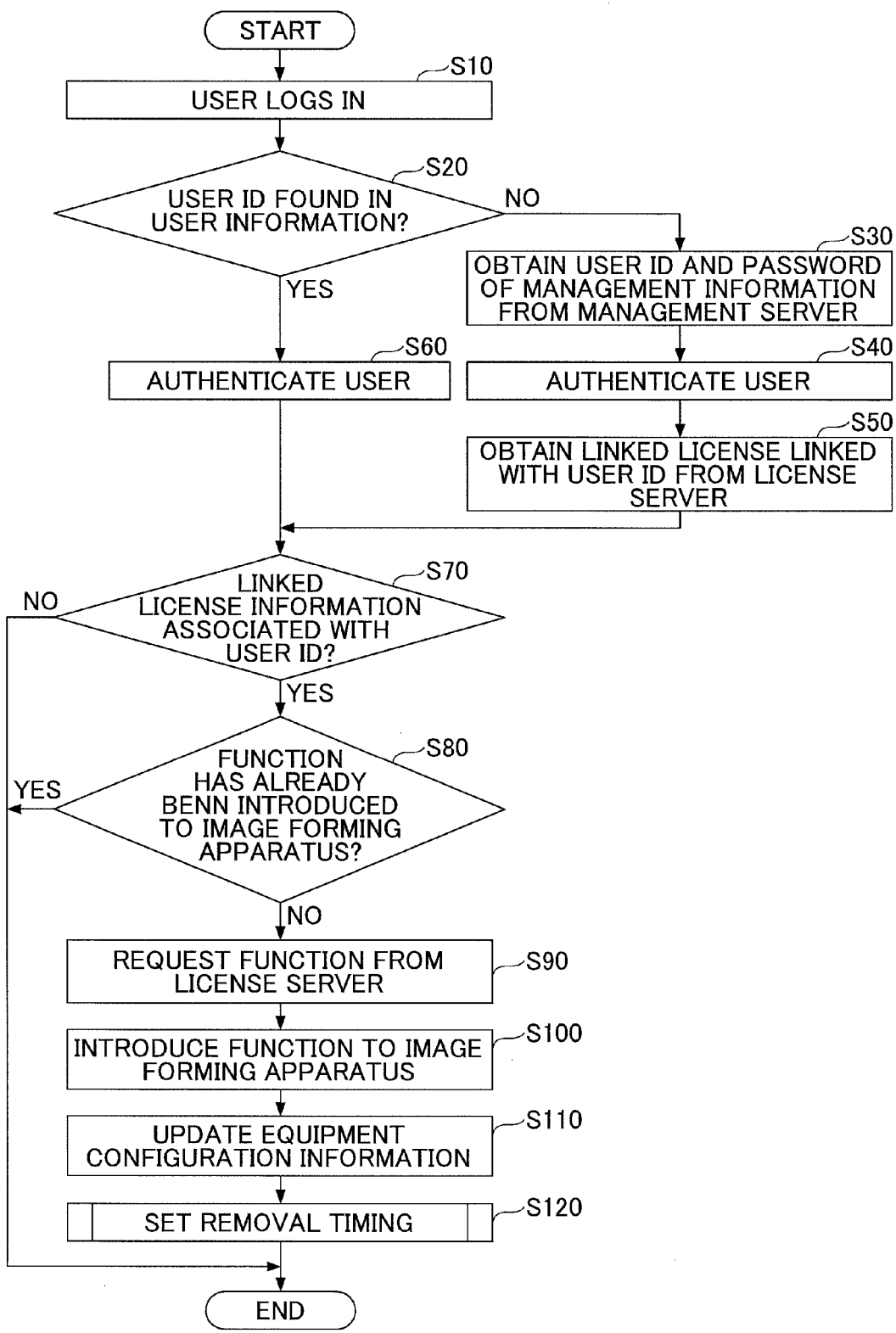
FIG. 11 is a flowchart illustrating the procedure for automatic introduction.

FIG. 10 is a drawing illustrating the automatic introduction of a function. FIG. 11 is a flowchart illustrating the procedure for automatic introduction.

A user logs in to the equipment item 100 (S10). In so doing, the user enters his/her user ID and password for login.

The user authentication unit 11 checks whether the user ID entered by the user has already been registered in the user information 21 (S20). When the user ID has already been registered in the user information 21 (Yes in S20), the user authentication unit 11 authenticates the user (S60).

When the user ID has not been registered in the user information 21 (No in S20), it cannot be ascertained whether a function corresponding to linked license information linked to the user ID has already been introduced. The user authentication unit 11 thus acquires the user ID and the password from the management information in the management server 700 for registration in the user information 21 (S30).

The user authentication unit 11 authenticates the user based on the user ID and password acquired from the management server 700 (S40). Upon successfully authenticating the user, the user information update unit 13 acquires linked license information corresponding to the user ID from the license server 400, and registers the linked license information in the user information 21 (S50). In this manner, the user ID, the password, and the linked license information are registered in the user information 21.

The function introducing unit 12 refers to the user information 21 to check whether linked license information is registered with respect to the user ID of the login user (S70). When there is no relevant linked license information registered (No in S70), the procedure illustrated in FIG. 11 comes to an end since there is no need to perform automatic function introduction.

When there is relevant linked license information registered (Yes in S70), the function introducing unit 12 refers to the equipment configuration information 22 to check whether the function of the linked license information has already been introduced in the equipment item 100 (S80).

When the function has already been introduced in the equipment item 100 (Yes in S80), the procedure illustrated in FIG. 11 comes to an end since there is no need to introduce the function.

When the function has not been introduced in the equipment item 100 (No in S80), the function introducing unit 12 informs the license server 400 of the function and requests the function to be provided (S90). In response, the license server 400 transmits the function and license information. The function introducing unit 12 introduces the function to the equipment item 100 by use of the license information (S100). As a result, the user can use the function.

After what is described above, the function introducing unit 12 updates the equipment configuration information 22 (S110). Through this updating, the equipment configuration information 22 is made to match the functions actually introduced to the equipment item 100.

In the manner as described above, the equipment item 100 can automatically introduce a function for which a user has a linked license.

Upon automatically introducing the function, the equipment item 100 receives an indication of removal timing (S120), which is one of the features of the equipment item 100 of the present embodiment.

[User's License and Example of Displayed Screen]

An example of a displayed operating screen will be described before describing removal timing. In order to provide a user with a function for which the user has a linked license, the equipment item 100 displays on the operating screen an icon linked with the function for which the user has linked license information. It follows that the operating screen may vary from user to user.

Figure 12:
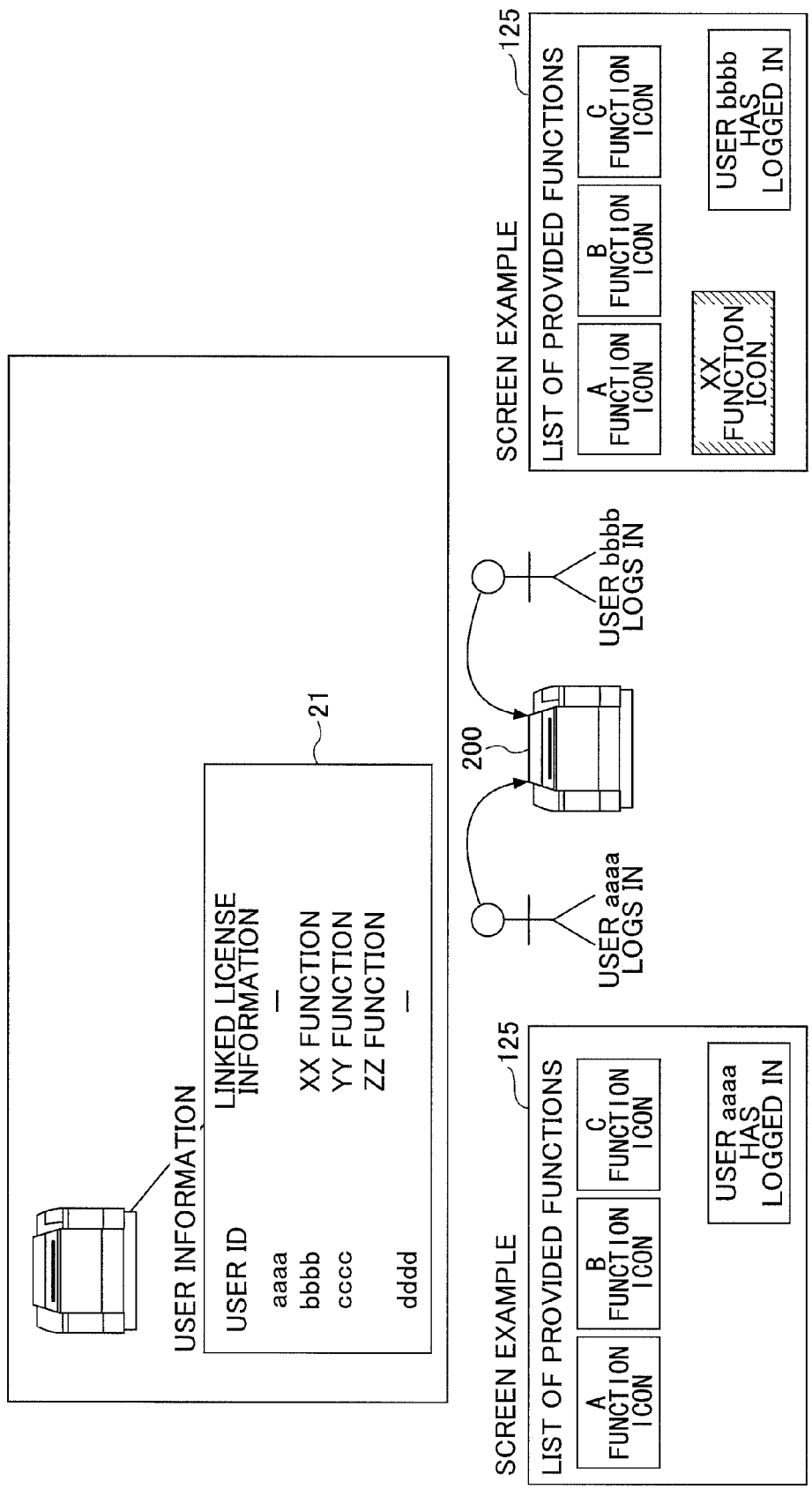
FIG. 12 is a drawing illustrating relationship between the user information and an operation screen.

FIG. 12 is a drawing illustrating relationship between the user information 21 and the operating screen. The user aaaa and the user bbbb do not have linked license information. The user bbbb has an "XX function". The user cccc has a "YY function" and a "ZZ function". Here, "XX", "YY", and "ZZ" may be the same as the respective function names. In this example, the updating of the user information 21 has already been done.

In FIG. 12, the "A function icon", the "B function icon", and the "C function icon" (open rectangles) are icons of the default functions. Namely, the "A function icon", the "B function icon", and the "C function icon" are displayed regardless of which user has logged in.

When the user aaaa logs in to the equipment item 100, only the "A function icon", the "B function icon", and the "C function icon" are displayed on the operating screen due to the fact that the user aaaa does not have linked license information.

When the user bbbb logs in to the equipment item 100, on the other hand, the "XX function icon" is displayed in addition to the "A function icon", the "B function icon", and the "C function icon" displayed on the operating screen due to the fact that the user bbbb has linked license information for the "XX function".

These icons are linked with the applications stored in the function storing unit 23. The activation unit 16 identifies an icon selected by a user based on the operating position on the operation panel 125, and activates the application linked with the selected icon by reading the application from the function storing unit 23.

Figure 13:
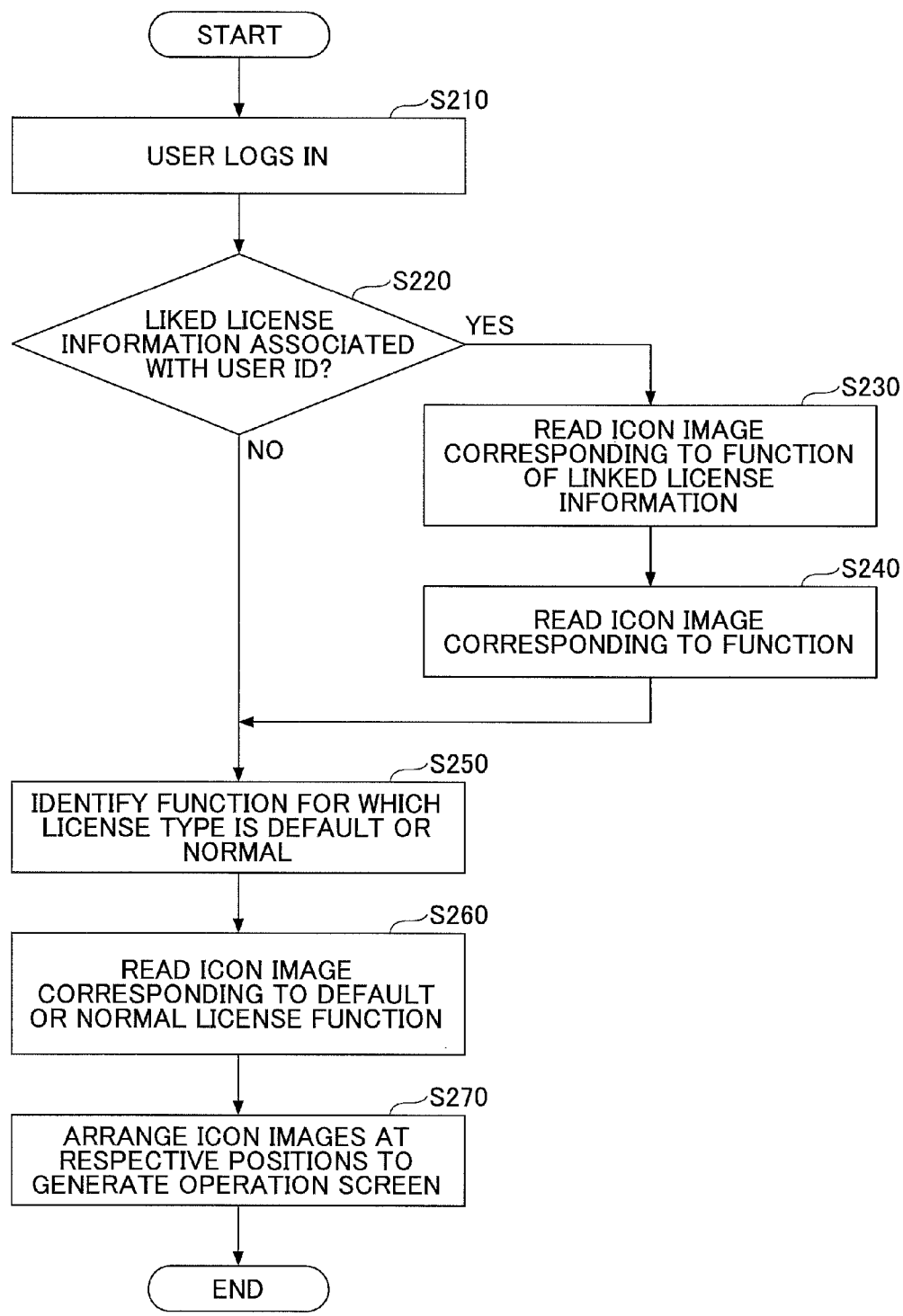
FIG. 13 is a flowchart illustrating an example of the procedure performed by a screen generating unit to generate an operation screen.

FIG. 13 is a flowchart illustrating an example of the procedure performed by the screen generating unit 15 to generate an operation screen.

A user logs in (S210). The screen generating unit 15 refers to the user information 21 to check whether linked license information is registered with respect to the user ID of the login user (S220).

When linked license information has already been registered (Yes in S220), the screen generating unit 15 reads (S230) an icon image corresponding to the function name of the linked license information from the component storing unit 24 that stores screen parts.

After this, the screen generating unit 15 reads an icon image corresponding to the linked license information from the component storing unit 24 that stores screen parts (S240). This icon image serves to display the "XX function icon", for example.

Returning to S220, linked license information may have not been registered (No in S220). In such a case, there is no need to provide a function corresponding to linked license information. The screen generating unit 15 thus identifies default functions and functions corresponding to normal licenses from the equipment configuration information (S250). These functions are selectable by a user on the operation screen regardless of who the user is.

Further, the screen generating unit 15 reads icon images corresponding to the default functions and the normal license functions from the component storing unit 24 that stores screen parts (S260).

The screen generating unit 15 then arranges these icon images at their respective positions to generate an operation screen (S270).

[Variation]

Irrespective of a user who has logged in to the equipment item 100, the icons of all the introduced functions may be displayed.

Figure 14:
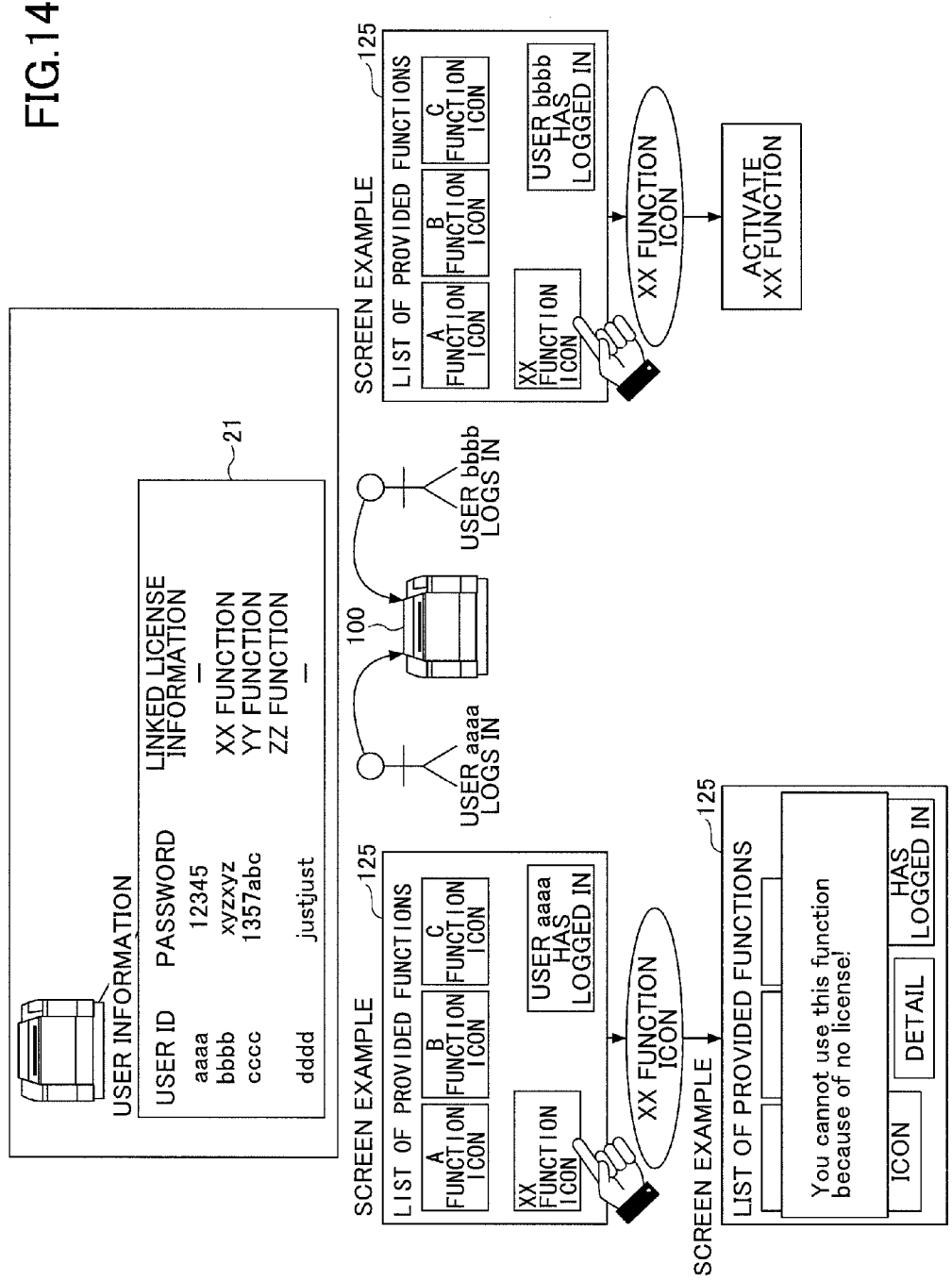
FIG. 14 is a drawing illustrating a relationship between the user information and the operation screen.

FIG. 14 is a drawing illustrating relationship between the user information 21 and the operation screen. In FIG. 14, a description of the same elements as those of FIG. 12 will be omitted. In FIG. 14, the "XX function icon" is displayed even when the login user is the user aaaa. When the user aaaa presses the "XX function icon" corresponding to the function for which the user aaaa does not have a linked license, the equipment item 100 may present the message "you cannot use this function because of no license", for example. In the case of such an operation screen, the same operation screen can be used by any login users. When the user bbbb presses the "XX function icon" corresponding to the function for which the user bbbb has a linked license, the equipment item 100 activates the XX function.

When displaying the above-noted message, the equipment item 100 may execute a wizard that prompts the user to purchase linked license information.

Figure 15:
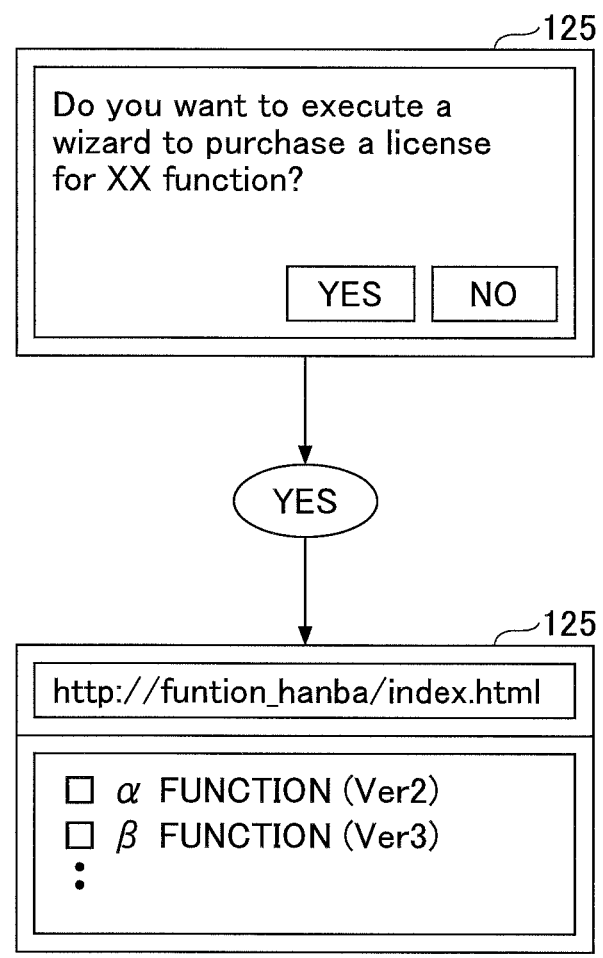
FIG. 15 is a drawing illustrating inducing actions performed by a wizard.

FIG. 15 is a drawing illustrating inducing actions performed by the wizard. When the user aaaa presses a "detail" button in FIG. 14, the equipment item 100 displays the message "Do you want to execute a wizard to purchase a license for XX function?" together with the button "YES" and the button "NO".

The user aaaa then knows that he/she needs to purchase a license in order to use the "XX function", and thereafter presses either the "YES" button or the "NO" button.

Upon the user pressing the "YES", the equipment item 100 starts the wizard. In FIG. 15, the equipment item 100 accesses the sales site previously described to display a list of functions. With this arrangement, the user can purchase a license for the "XX function" without entering the URL of this sales site. In this manner, the equipment item 100 can induce the user to purchase a license when the user wishes to use the function.

Figure 16:
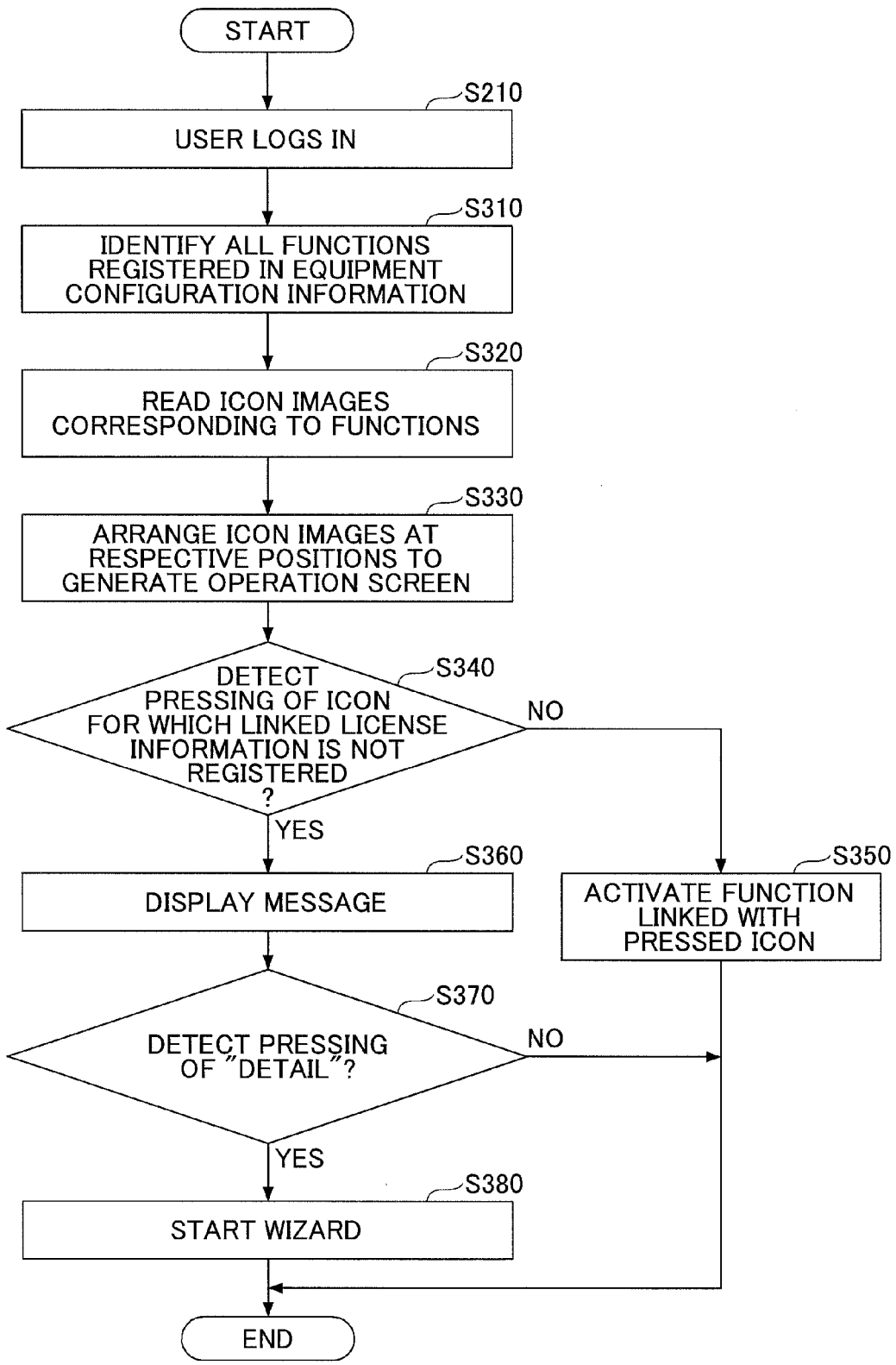
FIG. 16 is a flowchart illustrating an example of the procedure performed by a screen generating unit to generate an operation screen.

FIG. 16 is a flowchart illustrating an example of the procedure performed by the screen generating unit 15 to generate the operation screen as illustrated in FIG. 14. A user logs in (S210).

The screen generating unit 15 refers to the equipment configuration information 22 to identify all the functions introduced to the equipment item 100 (S310). Namely, the screen generating unit 15 identifies all the default functions and all the functions corresponding to normal licenses and linked licenses.

The screen generating unit 15 reads icon images corresponding to these functions from the component storing unit 24 (S320). The screen generating unit 15 then arranges the icon images at their respective positions to generate an operation screen (S330).

When a user presses an icon, the screen generating unit 15 checks whether an icon for which no linked license information is registered is pressed (S340). Specifically, the screen generating unit 15 identifies an icon based on the position at which the operation screen is pressed, thereby identifying the function linked with the icon. The screen generating unit 15 then checks whether the function is associated with the user ID of the login user in the user information 21.

When an icon for which linked license information is registered is pressed (No in S340), the function linked with this icon is able to be activated. The activation unit 16 thus activates the function linked with the icon that is pressed by the user (S350)

When an icon for which no linked license information is registered is pressed (Yes in S340), the function linked with this icon is unable to be activated. The activation unit 16 thus presents the previously-noted message (S360).

Subsequently, the determination unit 15 checks whether the "detail" button is pressed (step S370). When the "detail" button is not pressed (No in S370), the equipment item 100 takes no action, and returns to step S330 to detect the pressing of an icon, for example.

When the "detail" button is pressed (Yes in S370), the screen generating unit 15 starts the wizard for purchasing a license (S380). As a result, the screen as illustrated in FIG. 15 is displayed. With this arrangement, the use of a function can be controlled on a user-specific basis without changing the operation screens.

[Embodiment 1]

[Introduction of Function Upon Temporary Login and Setting of Removal Timing]

As was previously described, the equipment item 200 can dynamically introduce a function. A description will be first given of a situation in which the equipment item 200 introduces a function.

FIGS. 17A and 17B are drawings illustrating the states of the equipment items 100 and 200. As illustrated in FIG. 17A, the user bbbb normally uses the equipment item 100 on the ninth floor. According to the user information 21 of the equipment item 100 on the ninth floor, the user aaaa does not have linked license information whereas the user bbbb has linked license information for the "XX function".

The functions already introduced to the equipment item 100 on the ninth floor are the default function "copy", the normal license "marking", and the linked license "XX function". The user information 21 of the equipment item 200 on the second floor lists the user cccc and the user dddd as registered users, but does not list the user bbbb as a registered user. Since neither the user cccc nor the user dddd has linked license information, the "XX function" has not yet been introduced to the equipment item 200.

The user bbbb logs in to the equipment item 200 on the second floor to temporarily use the equipment item 200 on the second floor. As was previously described, the equipment item 200 on the second floor transmits a user ID to the management server 700 upon receiving a password and the user ID "bbbb" that are not registered in the equipment item 200. The equipment item 200 acquires the user ID and the password from the management server 700, and acquires linked license information by transmitting the user ID to the license server 400. In this manner, the user ID (e.g., aaaa), the password (e.g., 12345), and the linked license information (e.g., XX function) are registered in the user information 21 of the equipment item 200 situated on the second floor, as illustrated in FIG. 17B.

Further, the function introducing unit 12 introduces the XX function to the equipment item 200 situated on the second floor as was previously described, resulting in the function name of the XX function, the license type, and the expiration date being registered in the equipment configuration information 22.

Since the equipment item 200 on the second floor is only temporarily used by the user bbbb, there is no need to keep the introduced XX function indefinitely. The equipment item 200 thus receives from the user bbbb a setting indicative of the timing for removing the equipment item 200.

Figure 18:
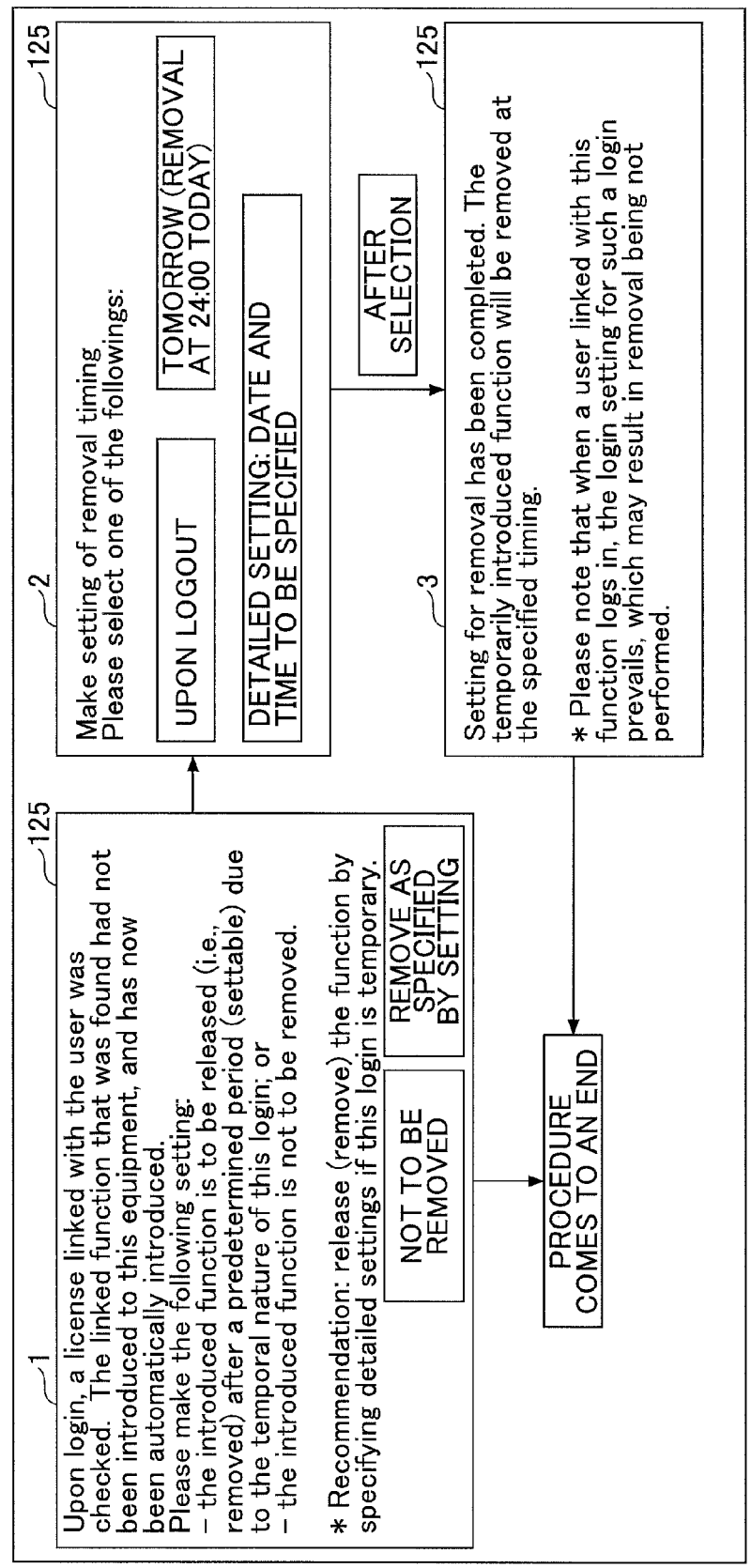
FIG. 18 is a drawing illustrating an example of the screen for setting the timing for automatically removing a function.

FIG. 18 is a drawing illustrating an example of the screen for setting the timing for automatically removing a function. Upon introduction of a function by the function introducing unit 12, the removal-timing receiving unit 27 prompts the user bbbb to set the timing for automatic removal. The removal-timing receiving unit 27 first inquires of the user bbbb whether automatic removal is to be performed.

A screen 1 in FIG. 18 shows the following message:
"Upon login, a license linked with the user was checked. The linked function that was found had not been introduced to this equipment, and has now been automatically introduced. Please make the following setting:
the introduced function is to be released (i.e., removed) after a predetermined period (settable) due to the temporary nature of this login; or
the introduced function is not to be removed.
* Recommendation: release (remove) the function by specifying detailed settings if this login is temporary."

The equipment item 200 in question is not the equipment item 100 that the user ordinarily uses, but the user may intend to use the equipment item 200 relatively frequently. In such a case, the user bbbb may select "not to be removed" in order to avoid needless removal and needless automatic introduction upon a subsequent login. In this case, the automatically introduced function is not removed, so that the user can use the XX function immediately upon a subsequent login following a logout.

When the temporary login is not so frequent, there may be no problem for the user bbbb to remove the function after a logout. In such a case, the user selects "remove as specified by settings". Such a selection may also be made upon considering resources.

When the user bbbb selects "remove as specified by settings", the equipment item 200 receives settings indicative of the timing at which the automatically introduced function is removed. The removal-timing receiving unit 27 displays a screen 2 illustrated in FIG. 18. In the screen 2 of FIG. 18, the user can select a timing from "upon logout", "tomorrow (removal at 24:00 today)", and "detailed setting: date and time to be specified".

It may suffice for the user bbbb to be able to use the XX function during the current login session, and there may be no plan to use the XX function thereafter. In such a case, the user bbbb may select "upon logout". With this arrangement, resources of the equipment item 200 are released immediately after the logout.

It may be the case that the user bbbb may intermittently use the equipment item 200 for all day once the user bbbb logs in to the equipment item 200. In such a case, the user may select "tomorrow" rather than "upon logout". With "upon logout" being selected, the function is automatically introduced each time the user bbbb logs in, and is removed each time the user bbbb logs out. With "tomorrow" being selected, repetitions of introduction and removal can be prevented. In the case that the user bbbb selects "tomorrow", the equipment item 200 removes the function immediately upon the end of the day on which the function was automatically introduced.

Further, when there is a plan to use the equipment item 200 temporarily over a period of a plurality of days in the case of a business trip or the like, the user bbbb may select "detailed setting". In this case, the user can select a date and time from a screen that is displayed separately.

Upon selection by the user, a change of screens is made so that the removal-timing receiving unit 27 displays a screen 3 illustrated in FIG. 18. The screen 3 shows the following message:
"Setting for removal has been completed. The temporarily introduced function will be removed at the specified timing.
* Please note that when a user linked with this function logs in, the login setting for such a login prevails, which may result in removal being not performed."

What the last sentence starting with "please note" means will be described later.

Figure 19:
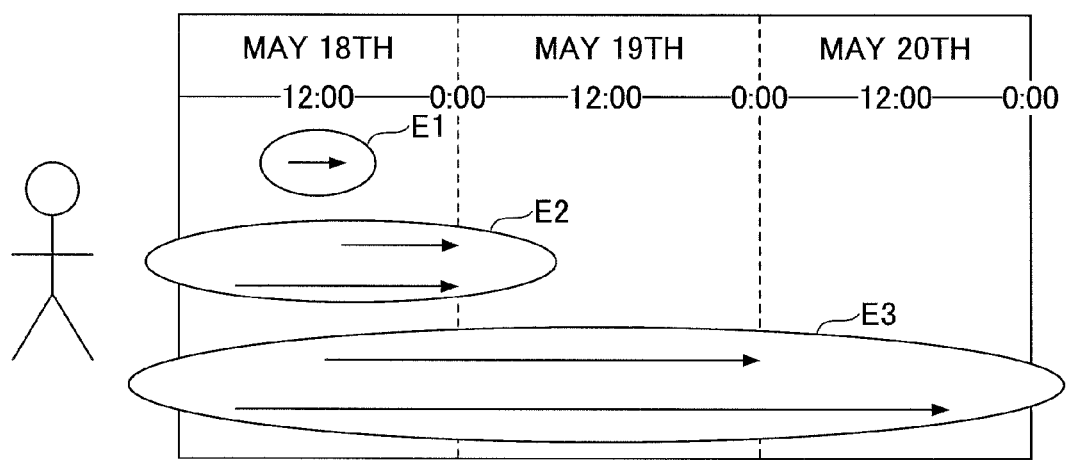
FIG. 19 is a drawing schematically illustrating removal timing.

FIG. 19 is a drawing schematically illustrating removal timing. In FIG. 19, passage of time is illustrated together with plural ellipses. Each ellipse represents a period of time during which an introduced linked license function is usable.

An ellipse E1 represents a period of time during which an introduced function is usable in the case in which the user selects "upon logout" as removal timing. The end of the ellipse E1 coincides with the time of logout. An ellipse E2 represents a period of time during which an introduced function is usable in the case in which the user selects "tomorrow" as removal timing. The end of the ellipse E2 coincides with the end of the day (e.g., May 18). An ellipse E3 represents a period of time during which an introduced function is usable in the case in which the user selects "detailed setting" as removal timing and sets a date and time. The end of the ellipse E3 coincides with the date and time specified by the user.

The equipment item 200 of the present embodiment described above automatically removes a function at the timing specified by the user after the function having a license type allowing user-specific licensing is introduced. As a result, the equipment item 200, which automatically introduces a function, prevents the function from exclusively using resources upon introduction thereof.

[Case in which Plural Users Have Linked License for the Same Function]

In the description provided heretofore, no consideration is given to the fact that when a user has a linked license for a function, other users may also have a linked license for this function. When plural users have a linked license for the same function, there may be a case in which removal is not necessary, or there may be a case in which the removal timing changes upon being set. In the following, details will be described.

Figure 20:
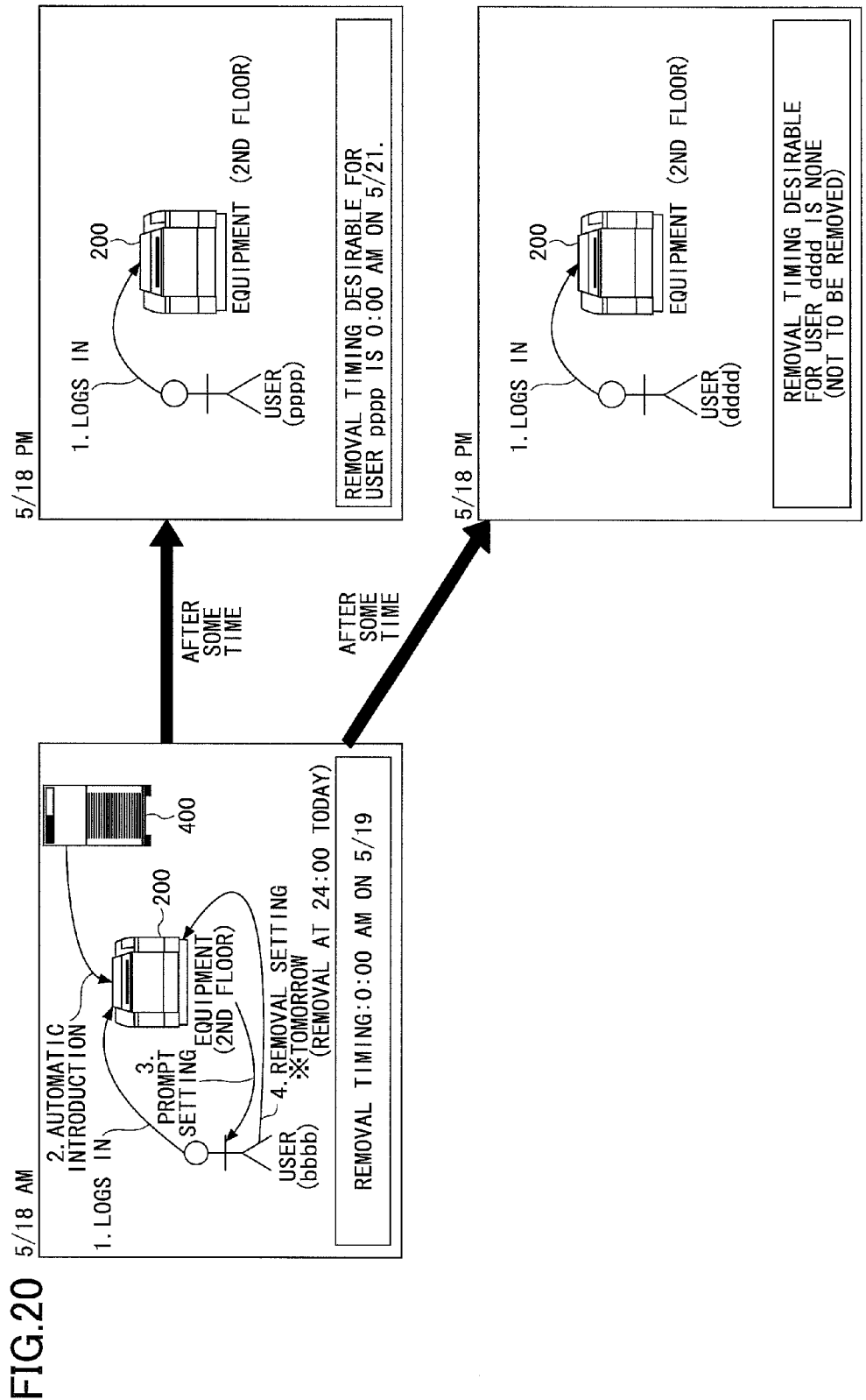
FIG. 20 is a drawing illustrating removal timing when plural users have a license for the same function.

FIG. 20 is a drawing illustrating removal timing when plural users have a linked license for the same function. The user bbbb logs in to the equipment item 200 on the afternoon of May 18, so that the equipment item 200 introduces the XX function. At the time of introduction, the user bbbb selects "tomorrow" as removal timing. That is, the XX function will be removed at 0:00 a.m. on May 19.

Then, a need arises for a user pppp to purchase a license for the XX function and to temporarily use the equipment item 200. The user pppp logs in to the equipment item 200 on the afternoon of May 18. In response, the user information 21 of the equipment item 200 is updated, so that the XX function is registered as linked license information for the user pppp.

The login action by the user pppp could define the timing at which the XX function is introduced to the equipment item 200. However, the XX function is not yet removed as of the afternoon of May 18 on which the user pppp logs in, so that there is no need to introduce the function.

In this case, upon the user pppp logging in to the equipment item 200, the removal-timing receiving unit 27 receives a setting of removal timing from the screen illustrated in FIG. 18. The user pppp selects the "detailed setting" as the timing for removing the XX function, and sets 0:00 a.m. of May 21 as the removal timing.

The removal timing "0:00 a.m. of May 19" specified by the user bbbb differs from the removal timing "0:00 a.m. of May 21" specified by the user pppp.

When different removal timings are specified for the same function, the function removing unit 18 preferentially uses the latest removal timing. With this arrangement, removal of the function at timings specified by respective users can be avoided when plural users wish to use the function. This is what is meant by the last sentence starting with "please note" on the screen 3 illustrated in FIG. 18.

Subsequently, the user dddd purchases a license for the XX function on the afternoon of May 18. The user dddd ordinarily uses the equipment item 200. The user dddd logs in to the equipment item 200 on the afternoon of May 18. In response, the user information 21 of the equipment item 200 is updated, so that the XX function is registered as linked license information for the user dddd. In this case also, the XX function is not introduced to the equipment item 200 (because it has already been introduced).

Since the user dddd ordinarily uses the equipment item 200, the user dddd does not want the function to be removed (i.e., does not want to set removal timing), and thus selects "not to be removed" in FIG. 18.

When there is a user who does not want the shared function to be removed, the equipment item 200 does not remove the function. With this arrangement, the removal of a function is avoided when there is a user who wants to use the function. The above-noted sentence starting with "please note" is displayed in order to make it known that the function may not be removed at the timing specified by the user.

The removal-timing receiving unit 27 stores the removal-timing table 26 for the purpose of reconciling different removal timings specified by respective users.

FIG. 21 is a drawing illustrating an example of the removal-timing table 26. In the removal-timing table 26, removal timings set by respective users are registered for linked license information (i.e., function name). The function removing unit 18 refers to the removal-timing table 26 to determine whether to remove the function and also when to remove the file.

It may be noted that even when the removal timing has arrived, the function removing unit 18 does not remove the function while the user remains logged in. With this arrangement, the user can use the function while using the equipment item 200 even though the specified removal timing has arrived.

Figure 22:
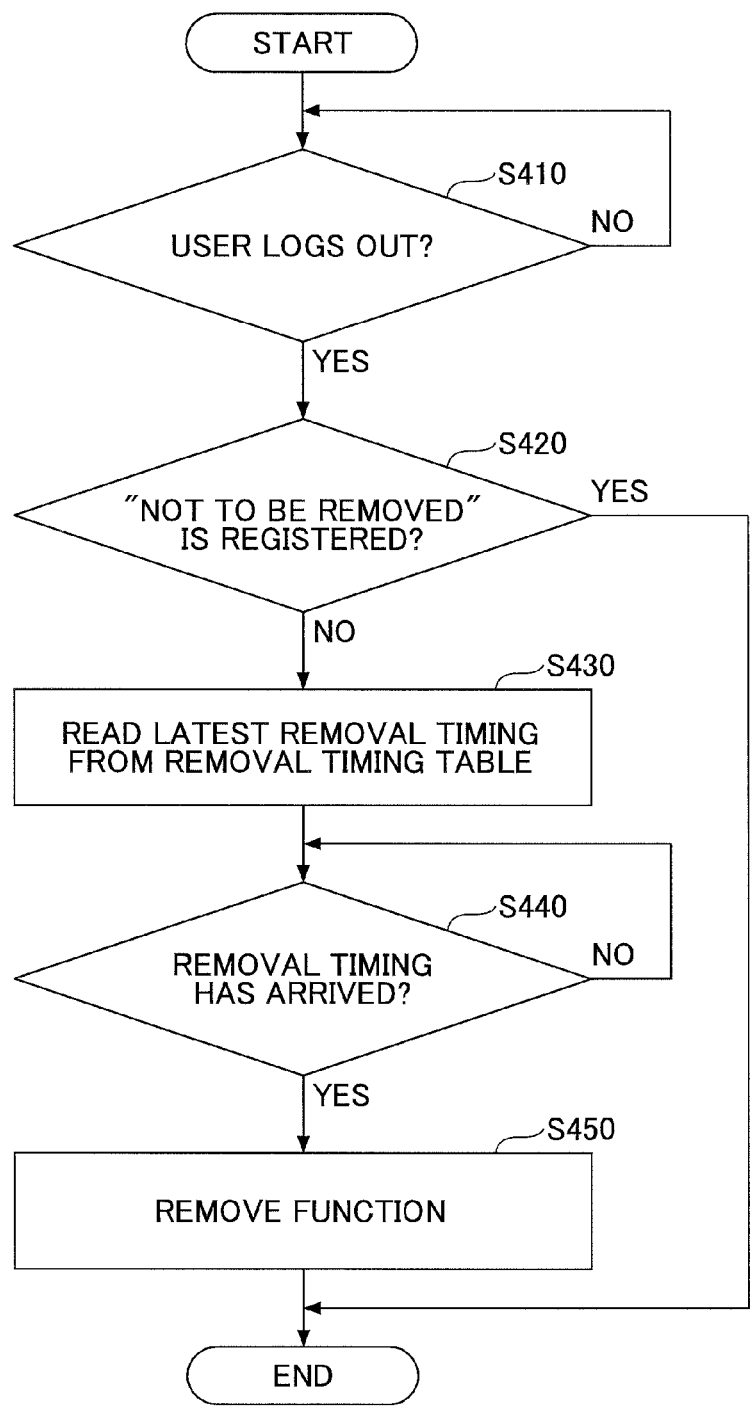
FIG. 22 is a flowchart illustrating the procedure performed by a function removing unit to automatically remove an automatically introduced function.

FIG. 22 is a flowchart illustrating the procedure performed by the function removing unit 18 to automatically remove an automatically introduced function.

The function removing unit 18 checks whether a user having a user ID registered in the removal-timing table 26 has logged out (S410). When no user has logged out (No in S410), the procedure illustrated in FIG. 22 comes to an end since it is not proper to remove the function.

When a user logs out (Yes in S410), the function removing unit 18 checks whether the setting "not to be removed" is found as a registered setting in the removal-timing table 26 (S420). When the setting "not to be removed" is a registered setting (Yes in S410), the procedure illustrated in FIG. 22 comes to an end since the function should not be removed.

When the setting "not to be removed" is not a registered setting (No in S410), the function removing unit 18 reads the latest removal timing from the removal-timing table 26 (S430). The function removing unit 18 then checks whether the removal timing read from the removal-timing table 26 has arrived (S440). Upon the arrival of the removal timing, the function removing unit 18 removes the function (S450).

With the procedure described above, the function removing unit 18 can properly adjust the timing for removing the function even when plural users have a linked license for the same function.

[Notification of Removal Timing]

Removal timings may not be reconciled after the removal timings are specified, but may be reconciled at the time of setting removal timings. Namely, the function removing unit 18 may ask a user whether to change a setting when the user is about to set removal timing for a function for which removal timing has already been set. This makes it possible to effectively utilize removal timing that has already been set, and also makes it possible to give deference to the intention of the user who has already set removal timing.

Figure 23:
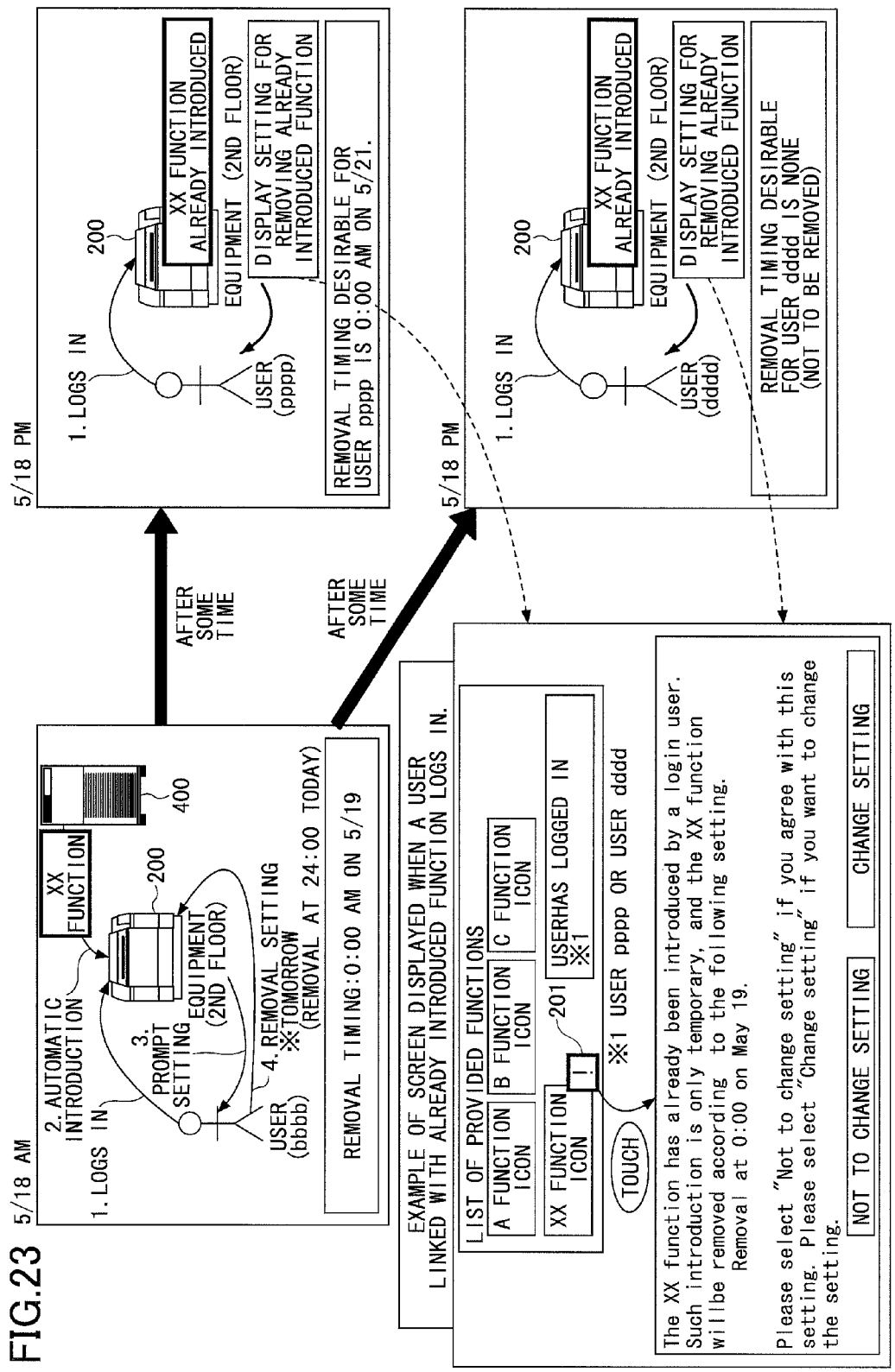
FIG. 23 is a drawing illustrating removal timing when plural users have a license for the same function.

FIG. 23 is a drawing illustrating removal timing when plural users have a license for the same function. In FIG. 23, a description of the same elements as those of FIG. 20 will be omitted. In FIG. 23, the underlying conditions in which each user purchases the XX function and wishes the function to be removed at certain timing are the same as in FIG. 20.

The user bbbb sets removal timing, so that the removal timing is registered in the removal-timing table 26.

FIG. 24A is a drawing illustrating an example of the removal-timing table 26. At this point in time, only the removal timing set by the user bbbb is registered.

In FIG. 23, the screen that is displayed upon the user pppp logging in to the equipment item 200 is different from the screen illustrated in FIG. 18. When the user pppp logs in, the XX function has already been introduced to the equipment item 200. An icon indicative of the XX function is thus displayed on the screen. A pop-up mark 201 is displayed next to the icon. When the user pppp selects the pop-up mark 201, the screen illustrated below will be displayed.

The screen shows the following message:
"The XX function has already been introduced by a login user. Such introduction is only temporary, and the XX function will be removed according to the following setting.
Removal at 0:00 on May 19.
Please select "Not to change setting" if you agree with this setting. Please select "Change setting" if you want to change the setting."

The user pppp chooses not to set removal timing if the user has no problem with the removal timing already in existence. The user chooses to set removal timing if the user has a problem with the removal timing already in existence. The removal-timing table 26 thus includes the removal timing that is last set as a proper removal timing.

The removal-timing receiving unit 27 checks whether removal timing that is later specified should be registered in the removal-timing table 26. The user bbbb may wish to use the function until 0:00 a.m. on the morning of May 19. In such a case, the meaning of the setting of removal timing made by the user bbbb is undermined if the user pppp is allowed to set removal timing indicating 6:00 on the afternoon of May 18 by accident or by choice.

In consideration of this, the removal-timing receiving unit 27 updates the removal-timing table 26 only when later-set removal timing is posterior to the preexisting removal timing. When the user pppp sets 0:00 a.m. of May 21 as removal timing as in FIG. 23, the removal-timing table 26 is changed to the table illustrated in FIG. 24B.

It is preferable to keep the preexisting registered removal timing even when an update is made. The preexisting removal timing is only valid until the later-set removal timing is registered. However, the user pppp may remove the removal timing that is later set. If the preexisting removal timing is not kept in such a case, no removal timing is left, resulting in the function imposing load on resources. In consideration of this, the removal-timing receiving unit 27 only disables the preexisting removal timing (as shown in parentheses) as illustrated in FIG. 24B, but does not remove the preexisting removal timing.

In FIG. 23, the XX function and the pop-up mark 201 are also displayed when the user dddd logs in to the equipment item 200. Upon the user dddd selecting the pop-up mark 201, the button "Not to change setting" and the button "Change setting" are displayed as in the screen 1 illustrated in FIG. 18. The user dddd does not want the function to be removed, so that the user dddd is believed to choose "Change setting".

The removal-timing receiving unit 27 updates the removal-timing table 26 by giving priority to a later-made setting over the preexisting removal timing when the later-made setting is "not to be removed". As a result, the removal-timing table 26 becomes the one illustrated in FIG. 24C.

FIG. 25 is a flowchart illustrating the procedure performed by the function removing unit 18 to automatically remove a function when removal timings are reconciled at the time of setting removal timings.

The removal-timing receiving unit 27 checks whether removal timing is set (step S510). When no removal timing is set (No in S510), the procedure proceeds to step S540.

When removal timing is set (Yes in S510), the removal-timing receiving unit 27 checks whether the later-set removal timing is anterior to the preexisting removal timing or the later-made setting is "not to be removed" (S520).

When it is not the case that the later-set removal timing is anterior to the preexisting removal timing or it is not the case that the later-made setting is "not to be removed" (No in S520), the procedure proceeds to step S540.

When it is the case that the later-set removal timing is anterior to the preexisting removal timing or that the later-made setting is "not to be removed" (Yes in S520), the removal-timing receiving unit 27 updates the removal table (S530).

The function removing unit 18 then checks whether a user having a user ID registered in the removal-timing table 26 has logged out (S540). When no user has logged out (No in S540), the procedure illustrated in FIG. 25 comes to an end since it is not proper to remove the function.

When a user logs out (Yes in S540), the function removing unit 18 checks whether the valid removal timing registered in the removal-timing table 26 has arrived (S550).

Upon arrival of the removal timing (Yes in S550), the function removing unit 18 removes the function (S560).

The removal-timing receiving unit 27 keeps checking whether the removal timing has been removed from the removal-timing table 26 (step S570), until the removal timing arrives (No in S550).

When the removal timing is deleted from the removal-timing table 26 (Yes in S570), the removal-timing receiving unit 27 updates the removal-timing table 26 by enabling the latest removal timing among the removal timings excluding the deleted removal timing (S580).

With the procedure described above, the function removing unit 18 can properly adjust the timing for removing the function to reflect user intentions even when plural users have a linked license for the same function.

[Embodiment 2]

In respect of the first embodiment, a description has been given of the arrangement by which the removal timing for removing an automatically introduced function can be set to the time of logout, a specified date and time, etc. These examples are the same as specifying the timing by a date and time. Removal timing, however, may be set by specifying other factors different from a date and time. In this embodiment, a description will be given of the various types of settings of removal timing.

Figure 26:
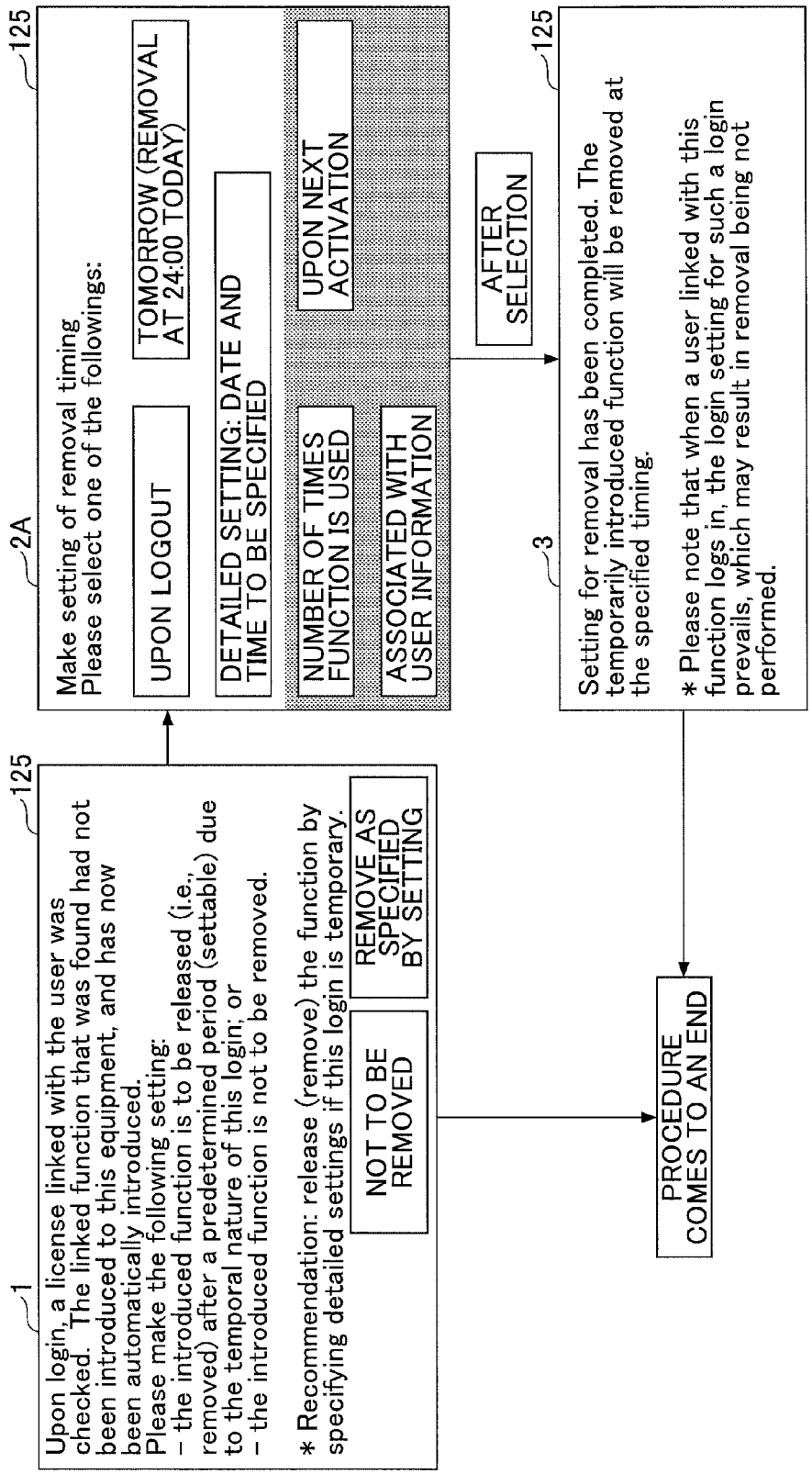
FIG. 26 is a drawing illustrating an example of the screen that receives a setting of removal timing.

FIG. 26 is a drawing illustrating an example of the screen that receives a setting of removal timing. In FIG. 26, a description of the same screens as those of FIG. 18 will be omitted. In FIG. 26, a screen 2A is different from the screen 2 illustrated in FIG. 18. Namely, three items, i.e., "the number of times the function is used", "upon next activation", and "associated with user information" are additionally provided as selectable items, compared with the example illustrated in FIG. 18.

The item "the number of times the function is used" is a button for displaying a screen by which to set the number of times the function licensed to the user through a linked license is activated. A user may set a number such as 10, 20, or the like. The function removing unit 18 removes the function at proper timing such as logout timing when the number of times the function has been activated becomes equal to the specified number of activations.

The item "upon next activation" is a button for setting removal timing such that the function removing unit 18 removes the function upon next activation of the equipment item 200.

The item "associated with user information" is a button for setting removal timing to the time at which the user information 21 is removed by a user, by an administrator, or by an automatic means (i.e., proper timing such as logout timing upon removal of the user information 21, to be exact). A function is automatically introduced because the linked license information is registered in the user information 21. Because of this, the removal of the user information will eliminate the need to keep the introduced function. The user information 21 may be explicitly removed by a user or by an administrator. Alternatively, the user information update unit 13 may remove the user information 21 with respect to a user who has not logged in for a predetermined period of time.

FIG. 27 is a drawing illustrating an example of the removal-timing table 26 according to the present embodiment. It is difficult to compare a setting based on a date and time and a setting based on the number of times the function is used to decide which one comes first. The same applies in the case in which the removal-timing receiving unit 27 makes a decision at the time of receiving a setting for the removal-timing table 26 as illustrated in FIG. 23. In consideration of this, the removal-timing receiving unit 27 allows all the removal timings specified by users to be set in the removal-timing table 26. The function removing unit 18 removes the function when all the conditions specified in the removal-timing table 26 are satisfied.

In FIG. 27, the user bbbb specifies "0:00 a.m. of May 19", the user pppp "the maximum number of times being 10", the user eeee "upon next activation", and the user ffff "associated with user information." The function removing unit 18 removes the XX function upon all these conditions being satisfied.

Figure 28:
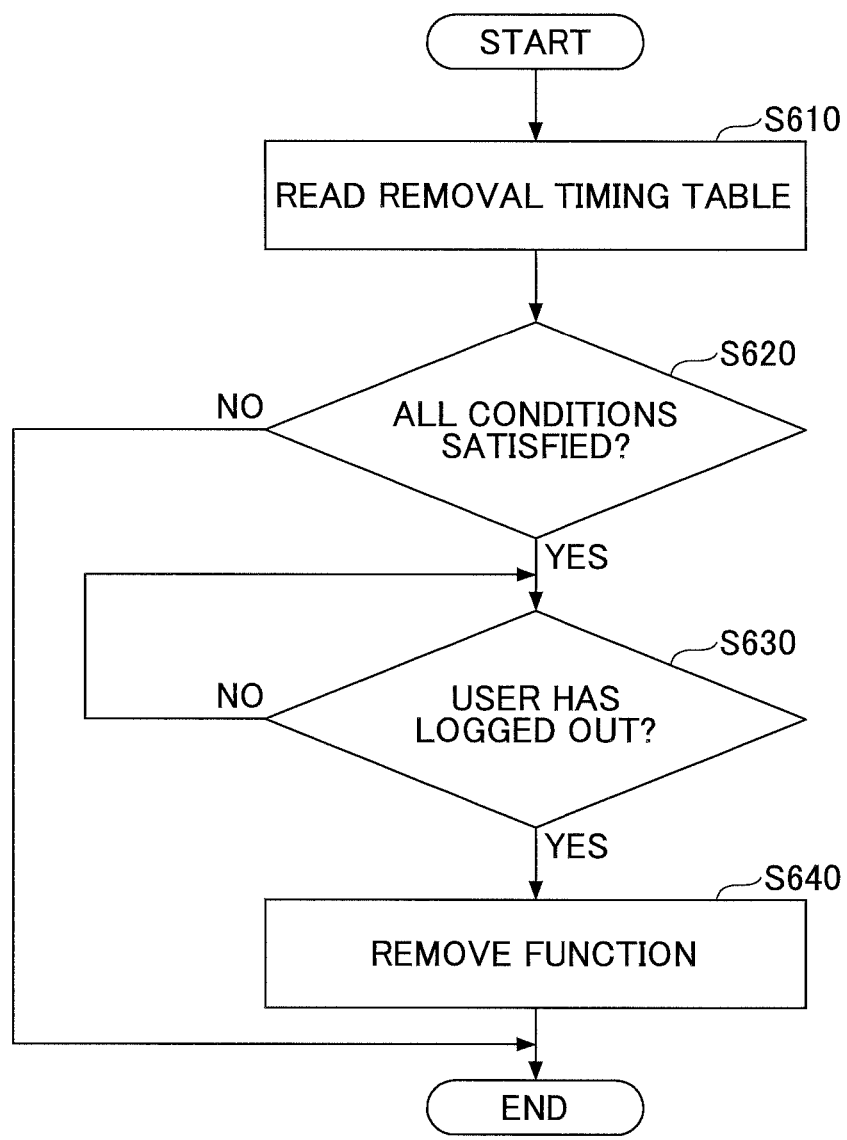
FIG. 28 is a flowchart illustrating the procedure performed by a function removing unit to automatically remove an automatically introduced function.

FIG. 28 is a flowchart illustrating the procedure performed by the function removing unit 18 to automatically remove an automatically introduced function.

The function removing unit 18 first reads the removal-timing table 26 at predetermined cycle intervals (S610). The function removing unit 18 checks whether all the conditions registered in the removal-timing table 26 are satisfied (step S620). If not all the conditions are satisfied (No in S620), the procedure illustrated in FIG. 28 comes to an end.

When all the conditions relating to the registered removal timings are satisfied (Yes in S620), the function removing unit 18 checks whether the user has logged out (S630). Upon the logout of the user (Yes in S630), the function removing unit 18 removes the function (S640).

As described above, the equipment item 200 of the present embodiment allows removal timings to be set based on factors different from date and time, thereby being able to receive various types of settings regarding removal timing.

[Embodiment 3]

In the first and second embodiments, a function is removed by giving priority to the latest removal timing. If there is a user who ordinarily uses the equipment item 200, however, this user is likely to prefer that the function be not removed. In such a case, it may be cumbersome for the user if the user needs to select "not to be removed" as illustrated in FIG. 18.

In this embodiment, the equipment item 200 is configured such that there is no need for a user to select "not to be removed".

In the following, the situations described in connection with FIG. 20 will be utilized. The user bbbb and the user pppp use the equipment item 200 only on a temporary basis whereas the user dddd normally uses the equipment item 200. Accordingly, the user information 21 regarding the user dddd is registered in the equipment item 200 all the time. The user information update unit 13 does not update user information 21 if the user ID of a login user is registered in the user information 21. It follows that the function removing unit 18 can ascertain whether the user dddd ordinarily uses the equipment item 200 by inquiring of the user information update unit 13 whether an update has been performed. Alternatively, the date and time of user-ID registration may be registered in the user information 21. The function removing unit 18 may ascertain that the user ordinarily uses the equipment item 200 if more than a predetermined length of time has passed since the registration date.

Figure 29:
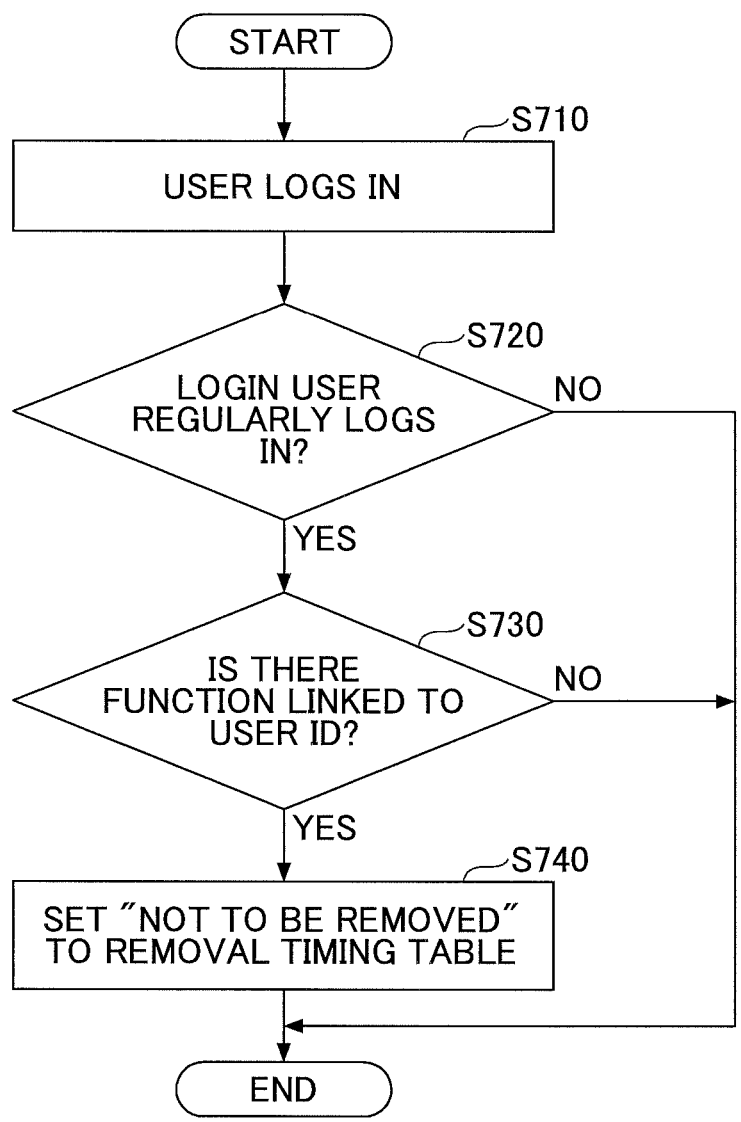
FIG. 29 is a flowchart illustrating the procedure performed by the function removing unit to update the removal-timing table.
Figure 30:
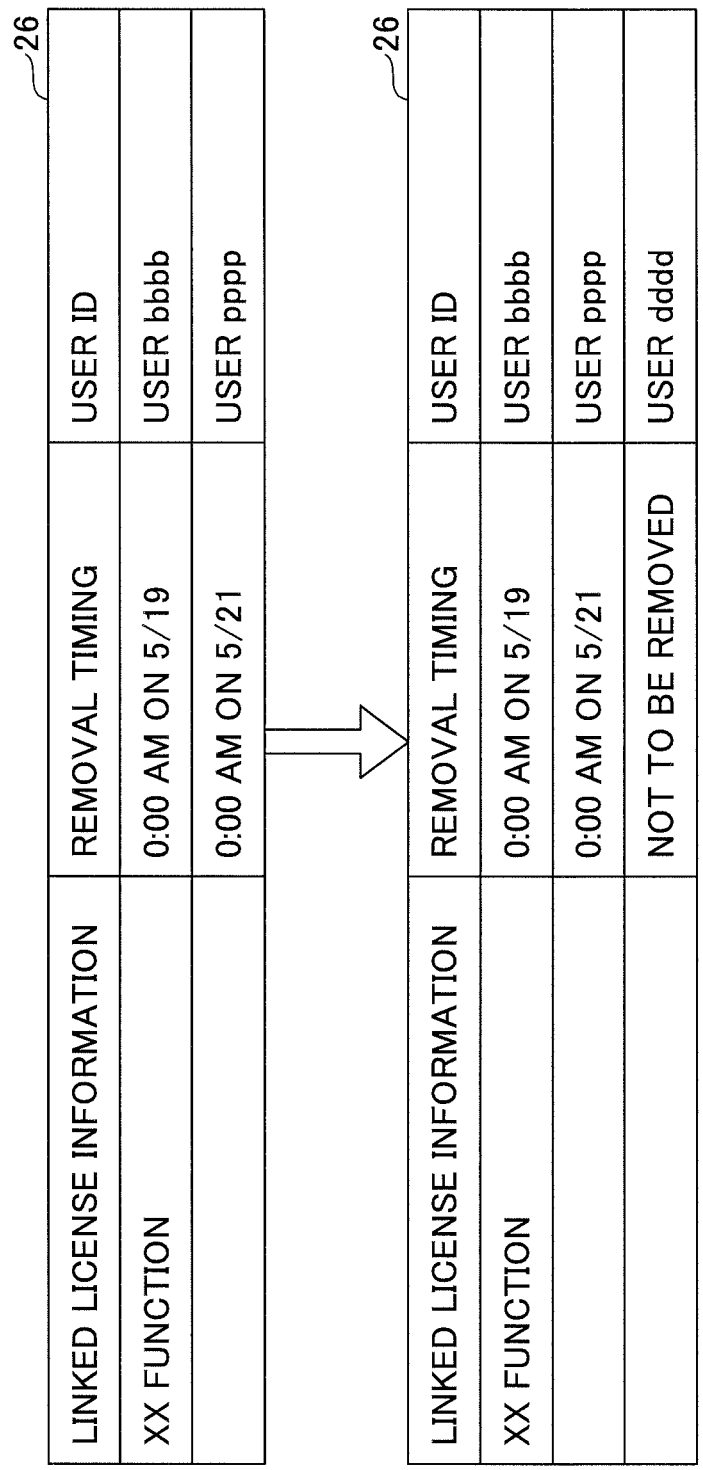
FIG. 30 is a drawing illustrating an example of transition of the removal-timing table.

FIG. 29 is a flowchart illustrating the procedure performed by the function removing unit 18 to update the removal-timing table 26. FIG. 30 is a drawing illustrating an example of a transition of the removal-timing table 26. Prior to the procedure of FIG. 29, the procedure of introducing a function has been performed as illustrated in FIG. 11. What is shown in FIG. 29 corresponds to part of the process performed in step S120. The user bbbb and the user pppp have already set respective removal timings in the removal-timing table 26 illustrated in FIG. 30 prior to the procedure of FIG. 29.

The user dddd logs in (S710). The function removing unit 18 checks whether the login user is a user who regularly logs in to this equipment (S720). This check is made as was previously described. When the login user is not a user who regularly logs in (No in S720), the function removing unit 18 takes no action. In this case, the screen as illustrated in FIG. 18 is displayed.

When the login user is a user who regularly logs in (Yes in S720), the function removing unit 18 checks whether there is a linked license function that is linked with the user ID (S730). When there is no linked license function linked with the user ID (No in S730), the procedure illustrated in FIG. 29 comes to an end.

When there is a linked license function linked with the user ID (Yes in S730), the function removing unit 18 makes the setting "not to be removed" to the removal-timing table 26 (S740). As a result, the removal-timing table 26 becomes the one illustrated in the lower half of FIG. 30.

In this manner, when a linked license function has already been introduced to the equipment item 200 that the user ddd regularly uses, the user can prevent the removal of the function simply by performing login. Even when removal timing has already been set as illustrated in the upper half of FIG. 30, the removal of the function can be prevented.

[Setting of "not to be Removed"]

As was described with respect to the present embodiment, the function removing unit 18 can prohibit a function from being removed when the function has been introduced to the equipment item 200 regularly used by the user. However, the user may not be bothered by the idea of removing the function if the user does not often use the function at the regularly used equipment item 200. It is thus preferable that the user is given a choice as to whether the function removing unit 18 makes the setting "not to be removed" to the removal-timing table 26.

Figures 31A, 31B:
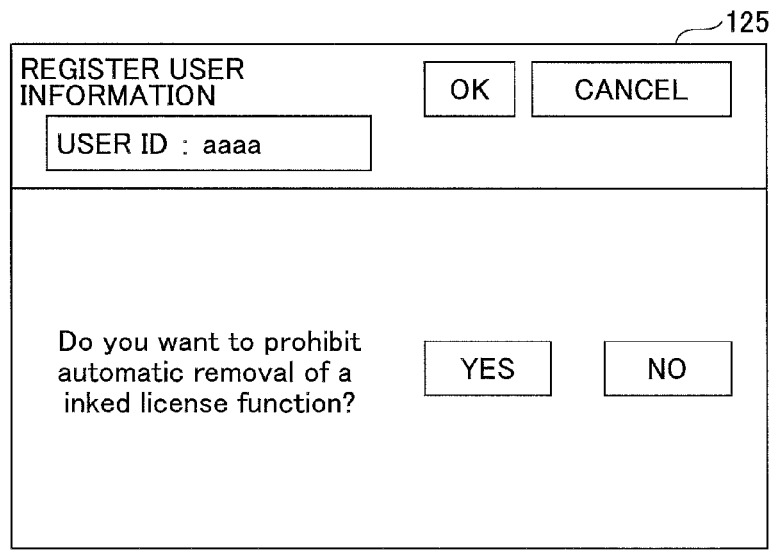
FIGS. 31A and 31B are drawings illustrating an example of the screen by which a user makes a setting as to whether to allow the setting "not to be removed" to be made to the removal-timing table.

FIG. 31A is a drawing illustrating an example of the screen by which a user makes a setting as to whether to allow the setting "not to be removed" to be made to the removal-timing table 26. This screen shows the message "do you want to prohibit automatic removal of a linked license function" together with a "YES" button and a "NO" button.

The above-noted screen is displayed when modifying the user information 21 is selected from among the items displayed on the initial setting screen, for example. As the user selects the "YES" button, the user information update unit 13 enables the setting "removal prohibited" in the user information 21.

FIG. 31B is a drawing illustrating an example of the user information 21. In this user information 21, the setting "removal prohibited" can be registered. With respect to a user having a user ID for which "removal prohibited" is disabled, step S740 in FIG. 29 is not performed, so that the setting "not to be removed" is not automatically registered in the removal-timing table 26.

Figure 32:
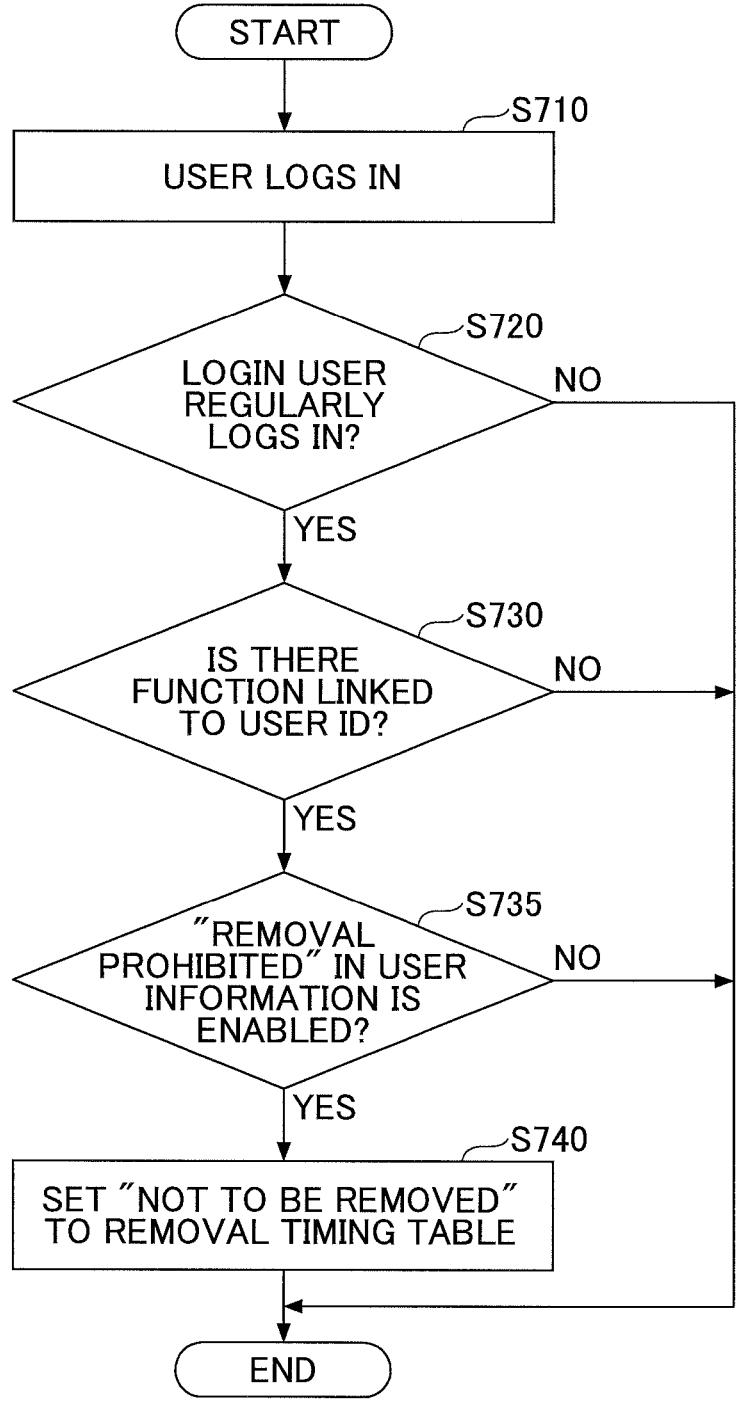
FIG. 32 is a flowchart illustrating the procedure performed by the function removing unit to update the removal-timing table.

FIG. 32 is a flowchart illustrating the procedure performed by the function removing unit 18 to update the removal-timing table 26. FIG. 32 differs from FIG. 29 in that there is a step (S735) in which the function removing unit 18 checks whether the setting "removal prohibited" is enabled in the user information 21 (S735).

The function removing unit 18 refers to the setting "removal prohibited" to determine whether to set "not to be removed" in the removal-timing table 26. Namely, the function removing unit 18 makes the setting "not to be removed" to the removal-timing table 26 as removal timing when the setting "removal prohibited" is enabled (Yes in S735). Further, the activation unit 16 does not make the setting "not to be removed" to the removal-timing table 26 as removal timing when the setting "removal prohibited" is not enabled (No in S735).

In this manner, the user can make a setting according to his/her preference as to whether to allow the setting "not to be removed" to be automatically made.

[Embodiment 4]

When the function removing unit 18 attempts to remove a function, the removal of the function could fail. This happens when the equipment item 200 performs a job during the removal of the function or when the power is switched off without performing a logout. In such a case, it is preferable that the function removing unit 18 makes a second attempt to remove the function. If the timing for removal can be set by a user, the user may be able to set the timing that is likely to achieve successful removal.

Figure 33:
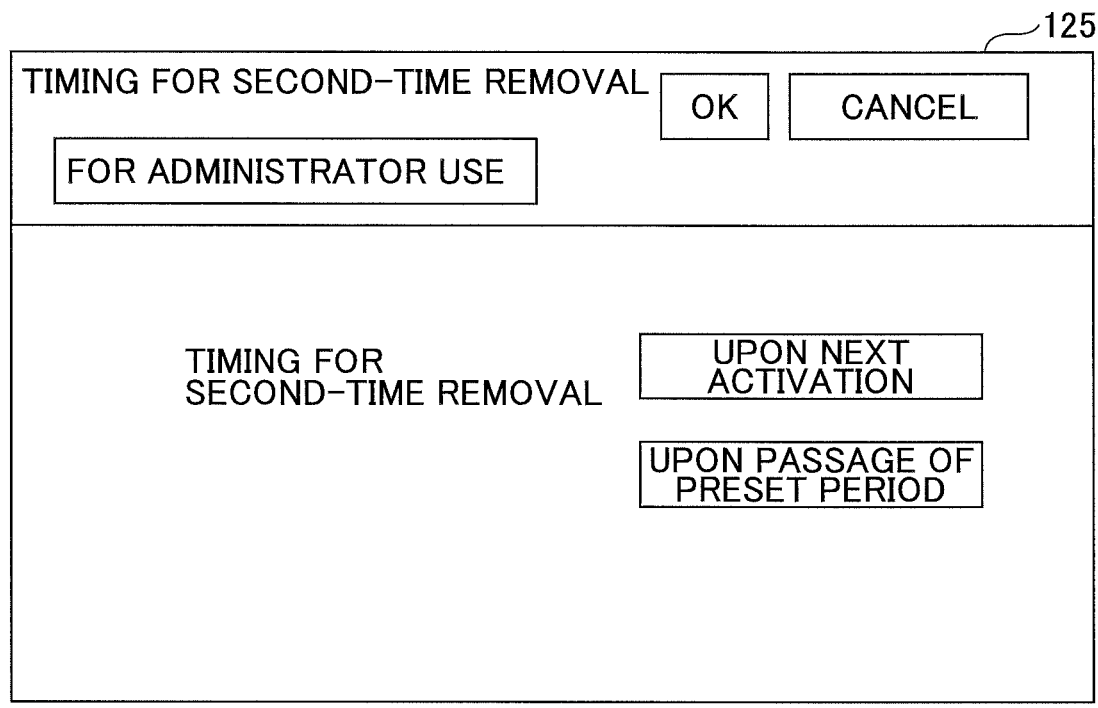
FIG. 33 is a drawing illustrating an example of the screen that receives a setting of the timing for second-time removal.

FIG. 33 is a drawing illustrating an example of the screen that receives a setting of the timing for second-time removal. In FIG. 33, a user can choose either one of or both of the "upon next activation" and "upon passage of a preset period" as the timing for second-time removal. This screen may be displayed by the second-time-removal-timing receiving unit 19 in response to a predetermined operation performed by an administrator.

The item "upon next activation" is a button for setting the timing of next activation of the equipment item 200 as the timing at which the function removing unit 18 attempts to remove the function the second time. The item "upon passage of a preset period" is a button for setting the end of a preset period immediately following the failure of removal as the timing at which the function removing unit 18 attempts to remove the function the second time. The preset period may be defined at the time of shipment of the equipment item 200, or may be set by the administrator. This preset period may be 30 minutes, one hour, or the like, for example.

The second-time-removal-timing receiving unit 19 registers the setting in the removal-timing table 26. Accordingly, the function removing unit 18 detects the removal timing and the second-time removal timing by simply referring to the removal-timing table 26.

Figure 34:
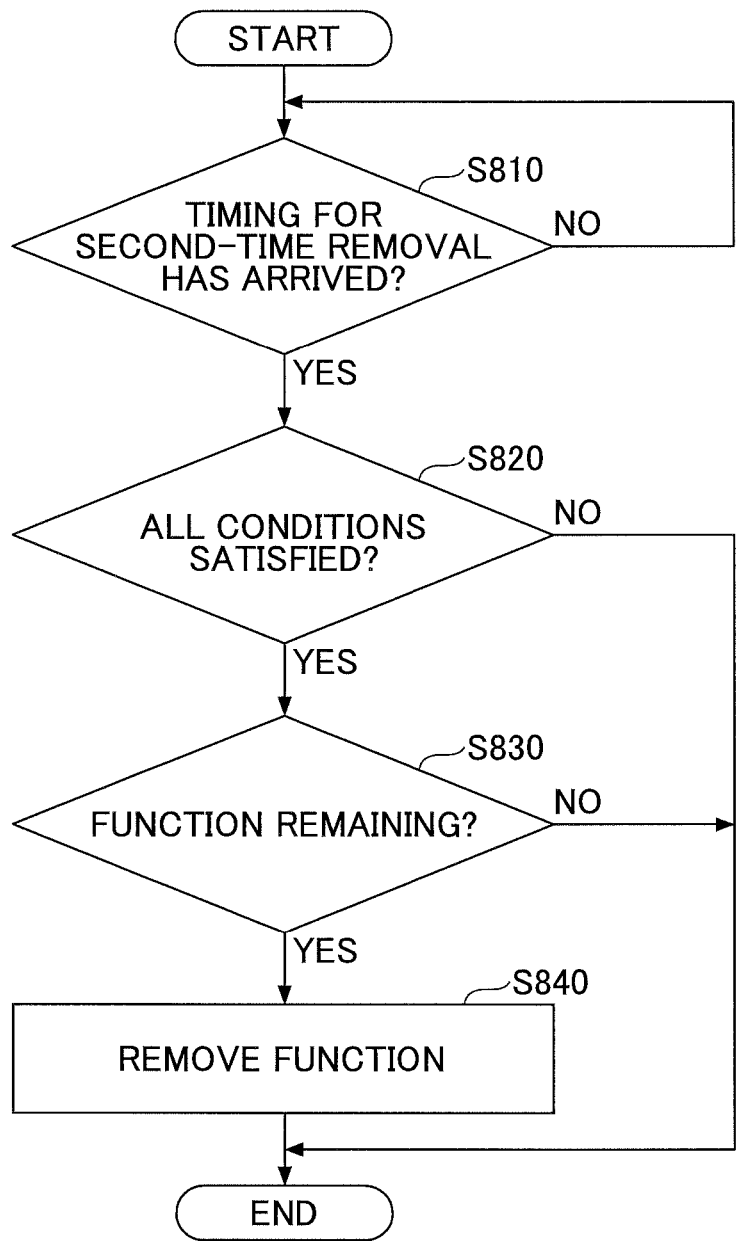
FIG. 34 is a flowchart illustrating the procedure performed by the function removing unit to attempt to remove an automatically introduced function the second time.

FIG. 34 is a flowchart illustrating the procedure performed by the function removing unit 18 to attempt to remove an automatically introduced function the second time.

The function removing unit 18 refers to the removal-timing table 26 to check whether the timing for second-time removal has arrived (S810).

When the timing for second-time removal has arrived (Yes in S810), the function removing unit 18 checks whether all the removal timings defined in the removal-timing table 26 are satisfied (S832). When not all the removal timings are satisfied (No in S820), the procedure illustrated in FIG. 34 comes to an end since there is no need to remove the function.

When all the conditions relating to the removal timings are satisfied (Yes in S820), the function removing unit 18 checks whether the relevant function has already been removed (S830). Namely, the function removing unit 18 refers to the equipment configuration information 22 to check whether the function for which all the removal timing conditions are satisfied still remains in the equipment configuration information 22.

If the function has not yet been removed (Yes in S830), the function removing unit 18 removes the function for which the removal timing has already arrived (S840). In this manner, the function removing unit 18 can remove the function in the end without failure even when failing to remove the function a couple of times.

According to the equipment item 200 of the present embodiment, the function for which the removal timing has arrived is removed without failure, thereby releasing resources.

[Embodiment 5]

In respect of the first through fourth embodiments, a description has been given of an equipment item that determines removal timing by referring to the removal-timing table 26 to remove a function. The present embodiment is directed to an equipment item that does not use the removal-timing table 26.

Assuming that a user operates only one equipment item 200 at any given moment in time, it suffices for a given function to be introduced to one equipment item. In the present embodiment, a user logs in to the equipment item 100, and, in response thereto, the function removing unit 18 of another equipment item 200 to which the user is not a login user removes the function.

Figure 35:
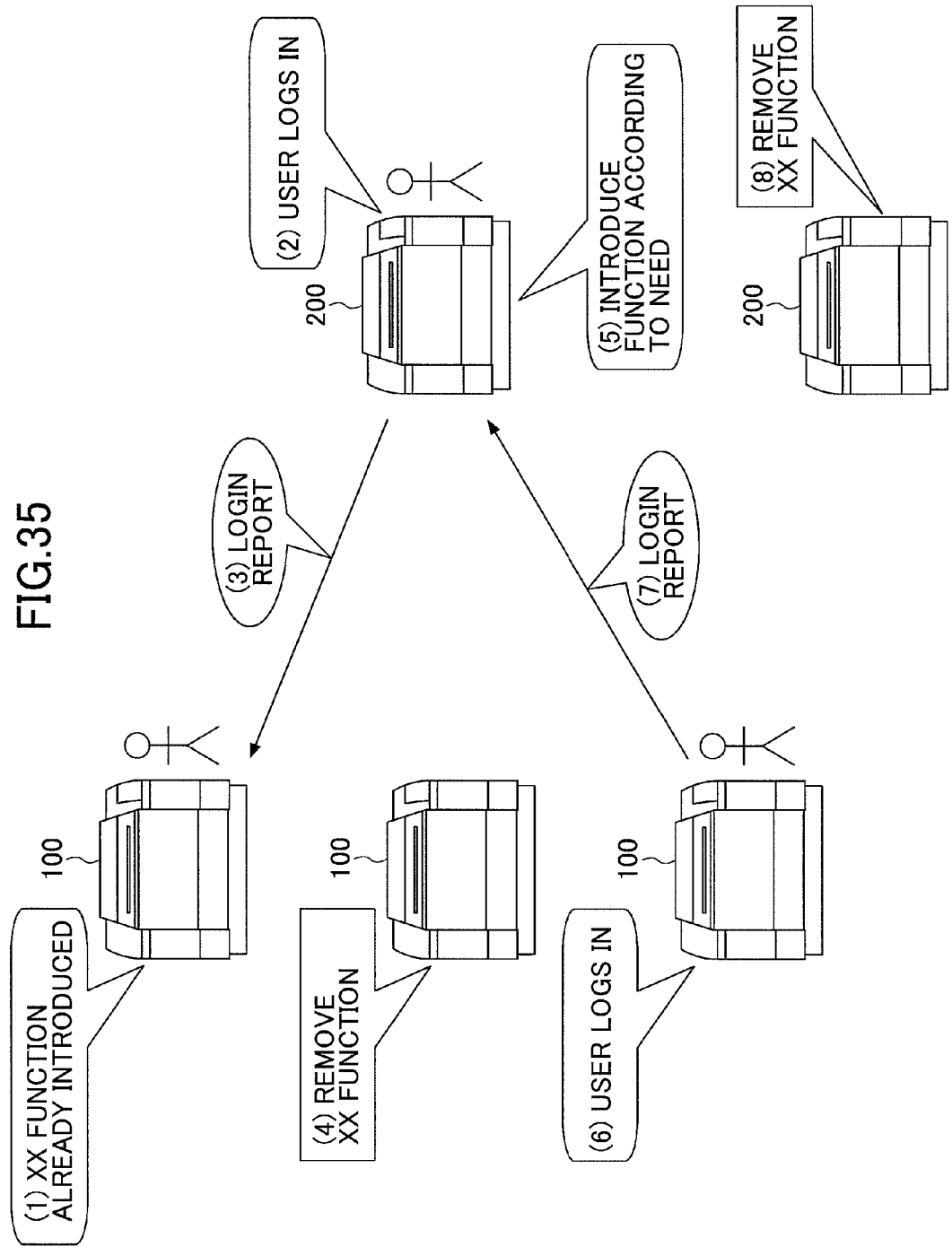
FIG. 35 is a drawing schematically illustrating the operation of the image forming apparatus which adopts the removal timing that coincides with a login timing at another equipment item.

FIG. 35 is a drawing schematically illustrating the operation of the equipment item 200 which adopts removal timing that coincides with the login timing at another equipment item.

(1) The XX function has already been introduced to the equipment item 100.

(2) A user logs in to the equipment item 200.

(3) The equipment item 200 notifies the equipment item 100 of the login through multi-address communication.

(4) The equipment item 100 detects the user's login to the equipment item 200, thereby removing the XX function. If there is another user using the XX function at the equipment item 100, the function removing unit 18 does not remove the XX function. If the user regularly uses the equipment item 100, restriction may be imposed so as not to allow the removal of the XX function.

(5) The equipment item 200 introduces the XX function if the XX function has not yet been introduced.

(6) After finishing the work at the equipment item 200, the user logs in to the equipment item 100.

(7) The equipment item 100 notifies the equipment item 200 of the login through multi-address communication.

(8) The equipment item 200 detects the user's login to the equipment item 100, thereby removing the XX function. If there is another user using the XX function at the equipment item 200, the function removing unit 18 does not remove the XX function. If the user regularly uses the equipment item 200, restriction may be imposed so as not to allow the removal of the XX function.

With this arrangement, the user does not have to set removal timing upon introducing a function to the equipment item 200, which eliminates the need for the removal-timing table 26.

Figure 36:
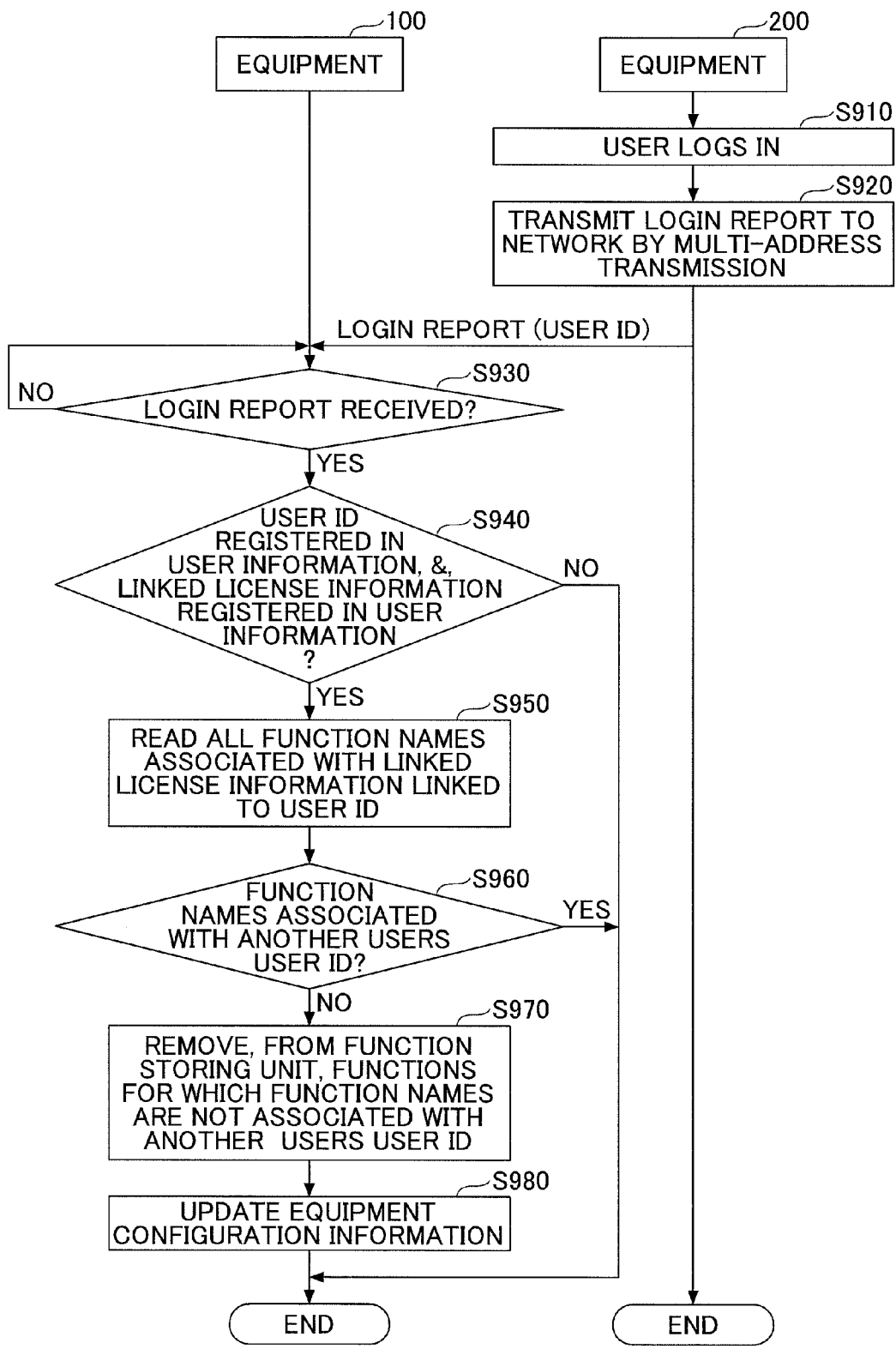
FIG. 36 is a flowchart illustrating the procedure performed by the function removing unit to remove a function.

FIG. 36 is a flowchart illustrating the procedure performed by the function removing unit 18 to remove a function. Upon login by a user, the user authentication unit 11 receives a login request from the user (S910). Upon successful authentication, the login reporting unit 17 sends a login report to the network by performing multi-address transmission (S920). The login report includes the user ID of the login user.

The function removing unit 18 monitors whether a login report has been received from other equipment items connected through the network (S930).

When the login report is received (Yes in S930), the function removing unit 18 checks whether the user ID contained in the login report is found as a registered item in the user information 21, and also checks whether linked license information is found as registered information (S940).

When the user ID is not a registered ID in the user information 21 or when the linked license information is not registered information (No in S940), there is no need to remove the function.

When the user ID contained in the login report is found as a registered item in the user information 21, and when linked license information is found as registered information (Yes in S940), the function removing unit 18 reads all the names of functions registered for the linked license information relating to the user ID (S950).

The function removing unit 18 then checks whether a registered function name of interest is associated with another user's user ID (S960). The fact that the function name is associated with another user's user ID indicates that this user may use the function, which means that the removal of the function may not be preferable.

The function removing unit 18 only removes functions that have registered names that are not associated with another user's user ID (S970). Upon removal, the function removing unit 18 updates the equipment configuration information 22 (S980).

As described above, the equipment item 200 of the present embodiment can remove a function without requiring a user to specify removal timing. When a user temporarily logs in to the equipment item 200, the function will not be removed from the equipment item 200 unless the user subsequently logs in to the equipment item 100. Accordingly, the user can use the function for whatever period of time, be it a couple of hours or a couple of days during a business trip.

<Variation>

The present embodiment has been described with reference to a case in which the removal-timing table 26 is not used. Alternatively, the removal-timing table 26 can be used similarly to the first through fourth embodiments. In this case, the message "login report" is displayed on the screen on which a setting of removal timing is made, thereby allowing a user to use a login report as a setting of removal timing.

Figure 37:
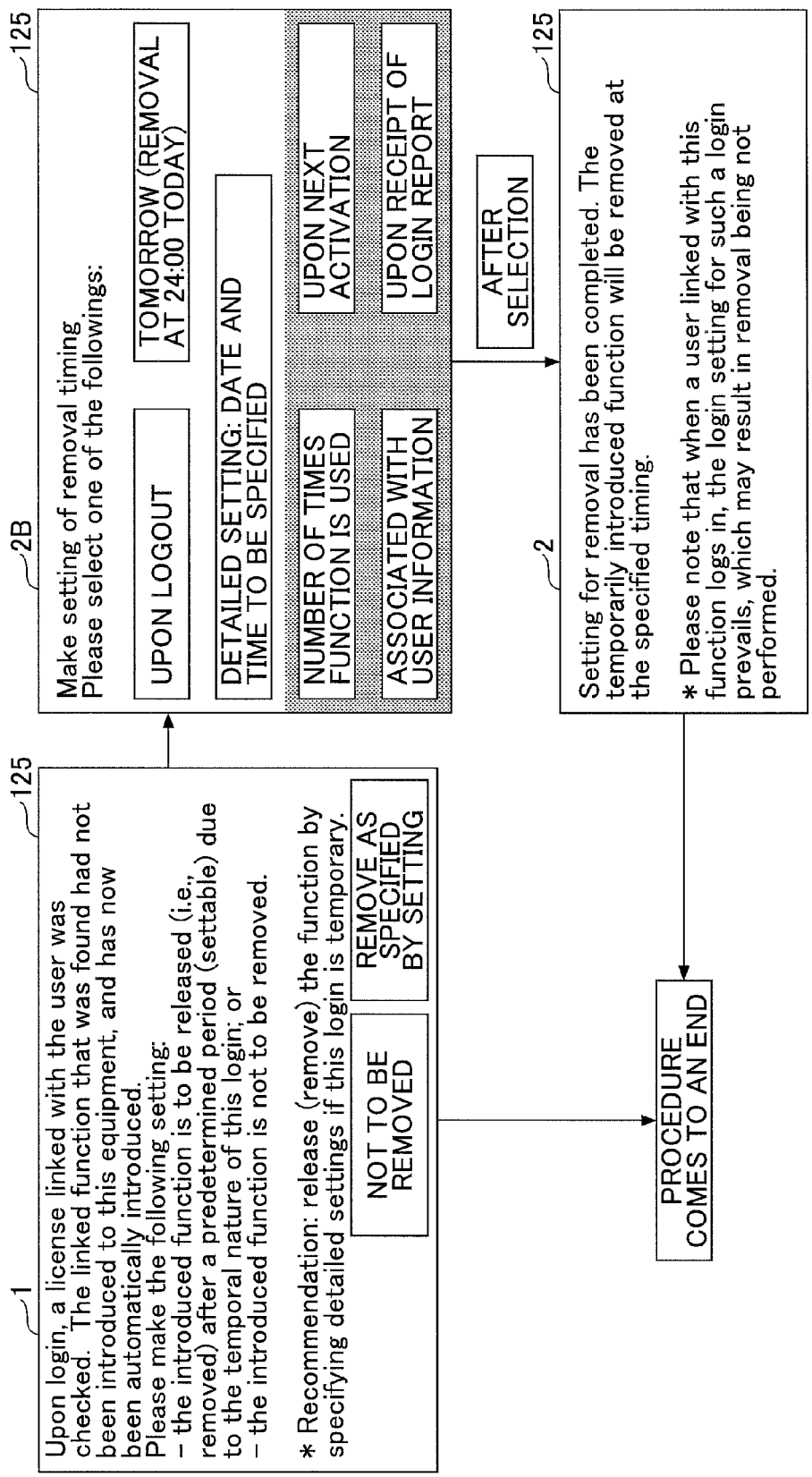
FIG. 37 is a drawing illustrating an example of the screen that receives a setting of removal timing.

FIG. 37 is a drawing illustrating an example of the screen that receives a setting of removal timing. In FIG. 37, a description of the same screens as those of FIG. 26 will be omitted. In FIG. 37, a screen 2B is different from the screen 2 illustrated in FIG. 18, and shows the setting "upon receipt of a login report" as a new selectable setting.

When a user selects the setting "upon receipt of a long report", the removal-timing receiving unit 27 registers the setting "upon receipt of a login report" to the removal-timing table 26. The function removing unit 18 removes a function upon receipt of a login report from another equipment item 100 when the dates, the maximum numbers of activations, and the conditions associated with user information set by other users are all satisfied. The procedure of removing a function is the same as the procedure illustrated in FIG. 28.

[Embodiment 6]

The first through fifth embodiments have been described with reference to a case in which a user can select "not to be removed". However, a large number of users may choose to select "not to be removed", resulting in resources being wasted despite the fact that the functions are seldom used. In this embodiment, the equipment item 200 limits the number of functions introduced thereto while allowing users to select "not to be removed".

When a function is to be introduced to the equipment item 200 that is frequently used by a user, no limit should be imposed on the number of functions introduced to the equipment item 200. A limit should be imposed on the introduction of functions only when a function is to be introduced to the equipment item 200 that is temporarily used by a user. In consideration of this, the present embodiment is directed to the equipment item 200 that limits the number of functions introduced thereto only when a user introduces a function to the equipment item 200 that the user temporarily uses.

Figure 38:
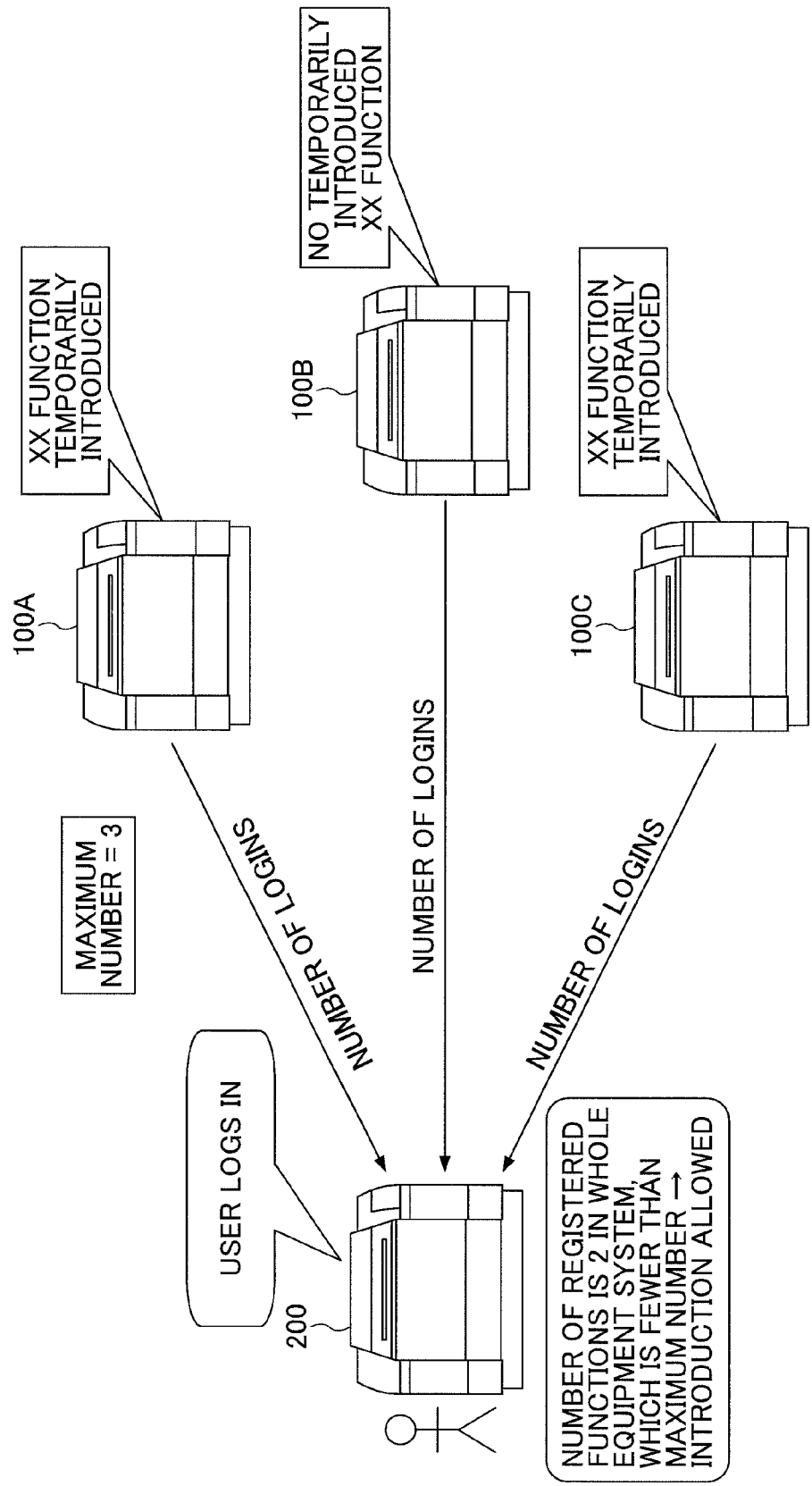
FIG. 38 is a drawing illustrating an outline of an equipment system.

FIG. 38 is a drawing illustrating an outline of the equipment system 600. A user logs in to the equipment item 200, so that the equipment item 200 starts introducing the XX function for which the user has a linked license.

The equipment item 200 inquires of other equipment items 100A through 100C of the equipment system 600 whether the XX function has been temporarily introduced. In FIG. 38, the equipment items 100A and 100B have the XX functions for temporary use while the equipment item 100B does not. The total number of XX functions in the equipment system 600 is thus 2.

The number of copies of a given function that can be introduced to the equipment items in the equipment system 600 is specified as a maximum number. In FIG. 38, the maximum number is 3. The equipment item 200 detects that the number of functions temporarily introduced is smaller than the maximum number, thereby deciding to introduce the XX function to the equipment item 200. In this manner, the equipment system 600 can limit the number of functions temporarily introduced to the equipment system 600 as a whole.

The equipment item 200 also sends a user ID to the equipment items 100A through 100C in the equipment system 600 to inquire about the number of logins performed by the user. Since each of the equipment items 100A through 100C keeps a history of user logins as a log, they transmit data indicative of the number of logins performed by the user over the previous one year or the like to the equipment item 200.

The equipment item 200 also extracts the number of logins from its local log, so that the equipment item 200 can determine whether the equipment item 200 is only temporarily used by the user. The equipment item 200 ascertains that the equipment item 200 is only temporarily used by the user when at least one of the equipment items 100A through 100C has the number of logins that exceeds, by more than a predetermined number, the number of logins to the equipment item 200.

When a user selects the setting "not to be removed", it is highly likely that the equipment item 200 is regularly used by the user. Accordingly, a determination as to whether the equipment is regularly used by the user may be made based on whether the user selects the setting "not to be removed".

Figure 39:
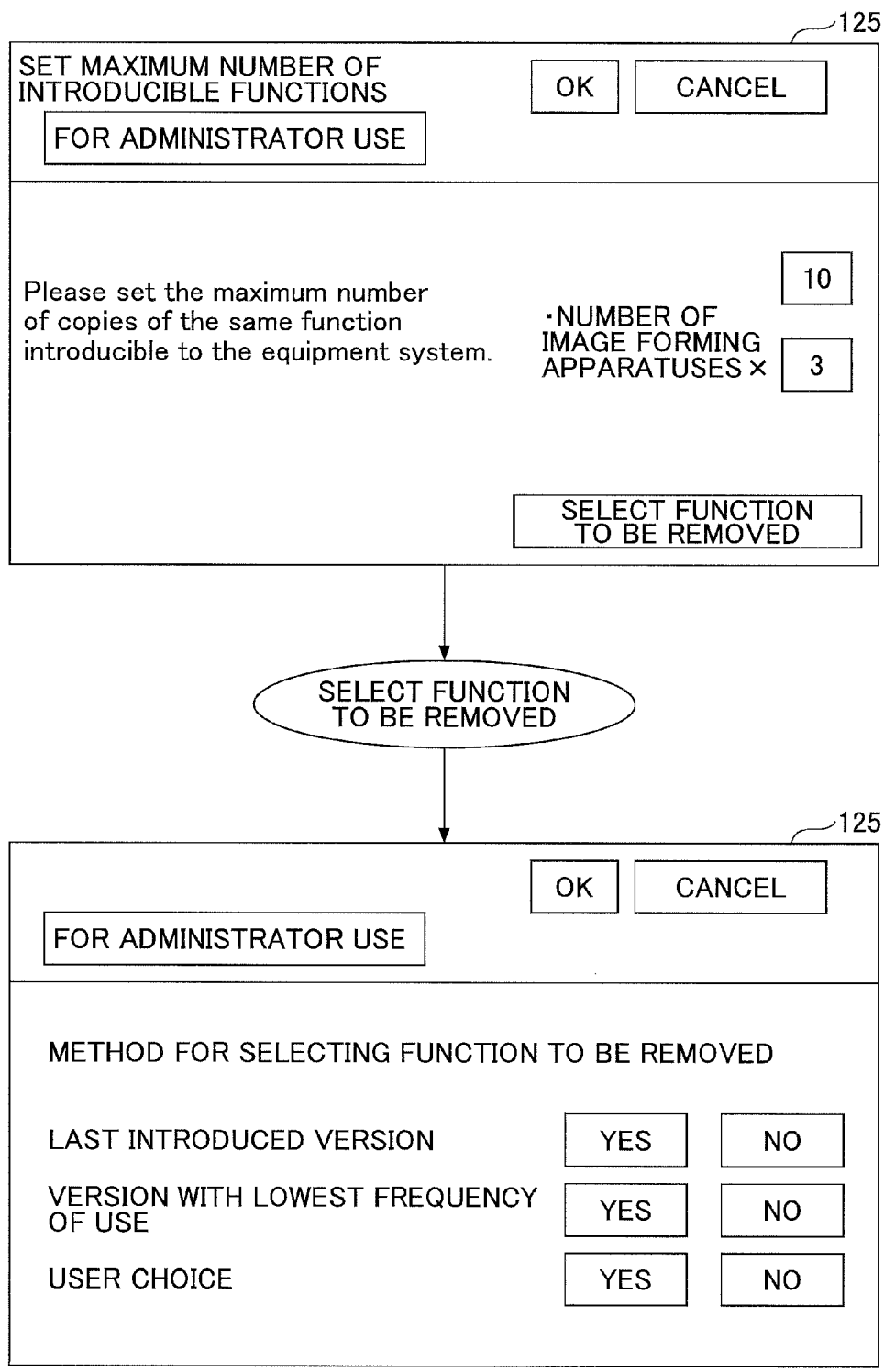
FIG. 39 is a drawing illustrating an example of the screen that receives a setting indicative of the number of functions introducible to the equipment system.

FIG. 39 is a drawing illustrating an example of the screen that receives a setting indicative of the number of functions introducible to the equipment system 600. This screen may be displayed by the maximum-number receiving unit 25 in response to a predetermined operation performed by an administrator. The screen illustrated in the upper half of FIG. 39 shows the message "please set the maximum number of copies of the same function introducible to the equipment system" together with two types of fields for setting the number of functions.

The administrator can set the maximum number of copies of the same function introducible to the equipment system by directly specifying a number or by specifying "n (integer) times the number of equipment items" connected to the network. As a general principle, the larger the number of equipment items 100 and 200 connected to the network, the larger the number of introducible functions (i.e., copies) should be. With the type of setting as in the latter case noted above, a user can set a proper number of introducible functions without counting the number of equipment items 100 and 200.

The maximum number specified on the screen should be shared by each equipment item. Having received the maximum number, the maximum-number receiving unit 25 transmits the maximum number to other equipment items through multi-address transmission. The maximum-number receiving unit 25 of each equipment item then stores the same maximum number in the HDD 133 or the like.

The screen shown in the upper half of FIG. 39 displays the button "select a function to be removed". An administrator presses the button "select a function to be removed", which causes a screen illustrated in the lower half of FIG. 39 to be displayed. The function removing unit 18 receives from this screen a setting indicative of which method is used to select a function to be removed. Regardless of the method used, only the function that is temporarily introduced is subjected to removal.

The function removing unit 18 selects the function to be removed according to a selection method chosen from the following methods:

(a) selecting the function that was last introduced among the functions already introduced to other equipment items;

(b) selecting the function for which the frequency of use has been lowest among the functions already introduced to other equipment items; and (c) selecting a function by explicit choice from the functions already introduced to other equipment items.

The administrator can choose any selection method from the three methods (a) through (c). On the selection screen, the "YES" button and the "NO" button are displayed next to each of the methods (a) through (c).

The function removing unit 18 receives and stores a choice made by the administrator, followed by transmitting the selected method to other equipment items through multi-address transmission. In response, the function removing unit 18 of each equipment item stores the same selection method in the HDD or the like. This makes it possible to use the same method of selecting a function to be removed at each equipment item.

FIG. 40 is a drawing illustrating an example of the equipment configuration information 22. In each equipment item, the equipment configuration information 22 includes "date and time of introduction" and "frequency of use over the previous one year" in order to implement the selection methods (a) and (b). Each equipment item registers "date and time of introduction" at the time of introducing a function, and the activation unit 16 increases a count indicative of the "frequency of use over the previous one year" each time the function is activated.

In the present embodiment, the number of functions already introduced is compared with the maximum number when the user temporarily uses the equipment item 200. It is thus preferable to count the number of functions that are temporarily introduced. To this end, an indication of either the "temporary introduction" or not is registered separately for each function in the equipment configuration information 22.

The equipment items 100A through 100C and 200 register "X" in the field of "temporary introduction" for the introduced function when the login user temporarily uses the equipment. With this arrangement, the equipment items 100A through 100C and 200 can identify a function that is temporarily introduced among all the introduced functions. If there is another user using the relevant function on a regular basis, the symbol "X" is not registered in the field of "temporary introduction".

Figure 41:
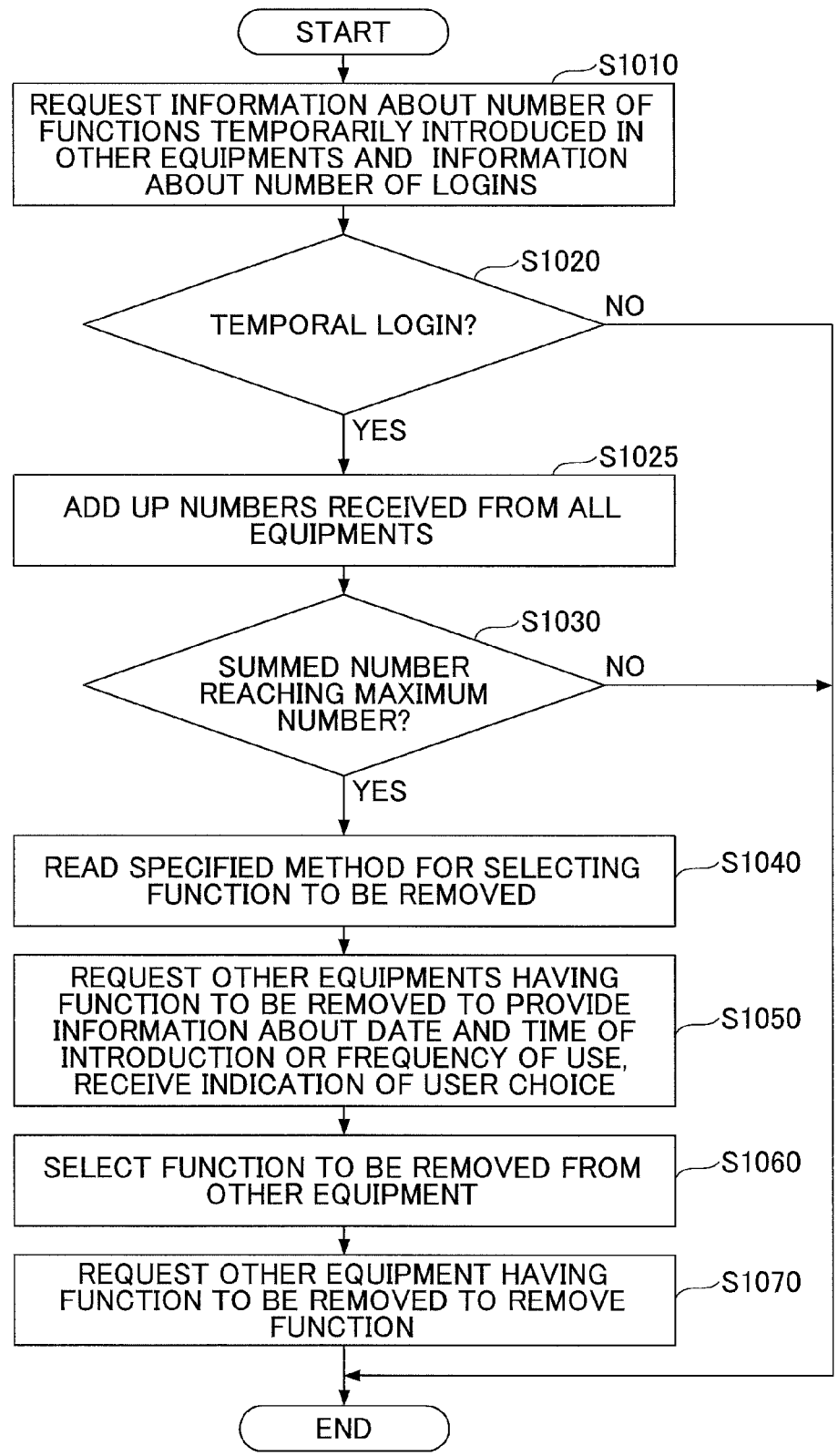
FIG. 41 is a flowchart illustrating the procedure of removing a function.

FIG. 41 is a flowchart illustrating the procedure of removing a function. This procedure is performed immediately before step S100 in the procedure for "automatic introduction of a function" illustrated in FIG. 11. It suffices for this procedure to be performed at the time of introducing a function. Accordingly, this procedure is performed at the time of introducing a function regardless of whether the function introduction is performed automatically or manually.

Prior to the introduction of a function, the function removing unit 18 needs to derive, from other equipment items, the number of already introduced copies of the function that is to be introduced. To this end, the function removing unit 18 inquires of the other equipment items 100A through 100C about the number of copies (functions) that are temporarily introduced and about the number of logins performed by the relevant login user (S1010). The equipment items 100A through 100C refer to the equipment configuration information 22 to transmit "1" if the function to be introduced is temporarily introduced, and also to transmit the number of logins performed by the user to the inquiring equipment.

The function removing unit 18 then checks based on the number of logins whether the user has just temporarily logged in to the equipment item 200 (S1020). When the user has not temporarily logged in to the equipment item 200 (No in S1020), the procedure illustrated in FIG. 41 comes to an end since there is no need to limit the introduction of a function. After this, the function is introduced according to step S100 illustrated in FIG. 11.

When the user has temporarily logged in to the equipment item 200 (Yes in S1020), the function removing unit 18 adds up the numbers received from all the other equipment items in order to limit the number of introduced functions (S1205).

The function removing unit 18 checks whether the total number reaches the maximum number (S1030).

When the total number does not reach the maximum number (No in S1030), the procedure illustrated in FIG. 41 comes to an end since there is no need to remove the function. After this, the function is introduced according to step S100 illustrated in FIG. 11.

When the total number reaches the maximum number (Yes in S1030), the function removing unit 18 reads the specified method of selecting a function to be removed in order to remove the function. In the case of the method of selecting a function to be removed being the method (c) previously described, the function removing unit 18 displays on the operation panel the list of the other equipment items 100A through 100C for which the function to be removed has been introduced, thereby prompting the user to make a choice.

In the case of the method of selecting a function to be removed being the method (a) previously described, the function removing unit 18 requests information about "date and time of introduction" from the other equipment items 100A through 100C for which the function to be removed has been introduced (S1050). In the case of the method of selecting a function to be removed being the method (b) previously described, the function removing unit 18 requests information about "the frequency of use" from the other equipment items 100A through 100C for which the function to be removed has been introduced (S1050). It may be noted that the equipment configuration information 22 is also subjected to comparison.

Based on the requested information, the function having the latest "date and time of introduction" in the other equipment items or the function having the lowest "frequency of use" in other equipment items are identified, and the equipment having the identified function is chosen as the equipment from which the function is to be removed (S1060). In the case of the method (c), the function of another equipment item that is to be removed is identified by user selection.

Thereafter, the function removing unit 18 requests the selected equipment to remove the function (S1070). In this manner, the function removing unit 18 of another equipment item can remove the function. After this, the function is introduced according to step S100 illustrated in FIG. 11. As described above, the equipment of the present embodiment can limit the number of introducible functions even when users tend to select "not to be removed".

Further, the present invention is not limited to these embodiments, but various variations and modifications may be made without departing from the scope of the present invention.

The present application is based on Japanese priority application No. 2010-161896 filed on Jul. 16, 2010, with the Japanese Patent Office, the entire contents of which are hereby incorporated by reference.

What is claimed is:

1. An image forming apparatus in which an activation of a program providing a function is allowed according to license information indicating that a user activating the program is authorized to activate the program, comprising:
   a processor;
   a login accepting unit to accept a user login;
   a program storing unit to store a program;
   a function introducing unit to obtain a given program licensed to an individual user and license information about the given program from an external source and to store the given program in the program storing unit;
   a user information storing unit to store user information that includes the license information about the given program that is stored by the function introducing unit, the license information being associated with a user ID of the individual user in the user information;
   a removal timing receiving unit to receive a setting of removal timing at which the given program stored by the function introducing unit is removed from the program storing unit; and
   a removal unit to remove the given program stored by the function introducing unit from the program storing unit upon arrival of the removal timing received by the removal timing receiving unit,
   wherein in case that removal of the given program has failed, the removal unit removes upon passage of a predetermined time the given program for which the removal timing has already arrived.

2. The image forming apparatus as claimed in claim 1, wherein the removal timing receiving unit receives the setting of removal timing specified based on a date and time.

3. The image forming apparatus as claimed in claim 1, wherein the removal timing receiving unit receives the setting of removal timing that defines the removal timing as a timing at which the individual user logs out.

4. The image forming apparatus as claimed in claim 1, wherein the removal timing receiving unit receives a setting indicating that the given program is not to be removed from the program storing unit by the removal unit.

5. The image forming apparatus as claimed in claim 1, wherein the removal timing receiving unit receives the setting of removal timing that defines the removal timing based on a maximum number of times the given program is activated, and the removal unit removes the given program stored in the program storing unit upon the number of activations of the given program exceeding the maximum number.

6. The image forming apparatus as claimed in claim 1, wherein the removal timing receiving unit receives the setting of removal timing that defines the removal timing as a timing at which the image forming apparatus is next activated, and the removal unit removes the given program stored in the program storing unit upon activation of the image forming apparatus.

7. The image forming apparatus as claimed in claim 1, wherein the removal timing receiving unit receives the setting of removal timing that defines the removal timing as a timing at which the user ID is removed from the user information, and the removal unit removes the given program from the program storing unit upon removal of the user ID from the user information.

8. The image forming apparatus as claimed in claim 1, wherein the removal timing receiving unit receives the setting of removal timing that defines the removal timing as a timing at which the individual user logs into another equipment item connected through a network, and the removal unit removes the given program from the program storing unit upon receiving the user ID of the individual user from said other equipment item.

9. The image forming apparatus as claimed in claim 1, wherein the removal timing receiving unit receives settings of different removal timings, and the removal unit removes the given program from the program storing unit upon all the removal timings being satisfied.

10. The image forming apparatus as claimed in claim 1, wherein the given program is associated with another user ID that is included in the user information for more than a predetermined period of time, and the removal unit does not remove the given program from the program storing unit despite a fact that the removal timing receiving unit has received the setting of removal timing.

11. The image forming apparatus as claimed in claim 10, wherein the removal timing receiving unit receives a setting indicating whether to remove the given program associated with the user ID that is included in the user information for more than a predetermined period of time.

12. The image forming apparatus as claimed in claim 1, wherein the removal unit removes, at a time of activation of the image forming apparatus, the given program for which the removal timing has already arrived in case that removal of the given program has failed.

13. The image forming apparatus as claimed in claim 12, further comprising a second-time-removal timing receiving unit to receive a setting of second-time removal timing at which the removal unit attempts to remove the given function a second time in case that removal of the given program has failed.

14. The image forming apparatus as claimed in claim 1, wherein the removal unit requests information about a number of introduced programs from one or more other equipment items connected through a network, and requests one of the other equipment items to remove a program when a total number of programs introduced, to the other equipment items exceeds a predetermined number.

15. The image forming apparatus as claimed in claim 14, further comprising a number receiving unit to receive a setting of the predetermined number.

16. The image forming apparatus as claimed in claim 14, wherein the removal unit requests the other equipment items to report a date and time of program introduction, and requests one of the other equipment items to remove a program when the one of the other equipment items has reported a latest date and time of program introduction.

17. The image forming apparatus as claimed in claim 14, wherein the removal unit requests the other equipment items to report frequency of program use, and requests one of the other equipment items to remove a program when the one of the other equipment items has reported a lowest frequency of program use.

18. The image forming apparatus as claimed in claim 14, wherein the removal unit receives from a user an indication of the one of the other equipment items that is to be requested to remove a program.

19. An equipment system, comprising:
an image forming apparatus in which an activation of a program providing a function is allowed according to license information indicating that a user activating the program is authorized to activate the program; and
a server to deliver the program and the license information to the image forming apparatus,
wherein the server includes license management information in which user IDs are associated with license information,
wherein the image forming apparatus includes:
a processor;
a login accepting unit to accept a user login;
a program storing unit to store a program;
a function introducing unit to obtain a given program licensed to an individual user and license information about the given program from an external source and to store the given program in the program storing unit;
a user information storing unit to store user information that includes the license information about the given program that is stored by the function introducing unit, the license information being associated with a user ID of the individual user in the user information;
a removal timing receiving unit to receive a setting of removal timing at which the given program stored by the function introducing unit is removed from the program storing unit; and
a removal unit to remove the given program stored by the function introducing unit from the program storing unit upon arrival of the removal timing received by the removal timing receiving unit,
wherein in case that removal of the given program has failed, the removal unit removes upon passage of a predetermined time the given program for which the removal timing has already arrived.

20. An image forming apparatus in which an activation of a program providing a function is allowed according to license information indicating that a user activating the program is authorized to activate the program, comprising:
a processor;
a login accepting unit to accept a user login;
a program storing unit to store a program;
a function introducing unit to obtain a given program licensed to an individual user and license information about the given program from an external source and to store the given program in the program storing unit;
a user information storing unit to store user information that includes the license information about the given program that is stored by the function introducing unit, the license information being associated with a user ID of the individual user in the user information;
a removal timing receiving unit to receive a setting of removal timing at which the given program stored by the function introducing unit is removed from the program storing unit; and
a removal unit to remove the given program stored by the function introducing unit from the program storing unit upon arrival of the removal timing received by the removal timing receiving unit,
wherein the removal timing receiving unit receives the setting of removal timing that defines the removal timing as a timing at which the individual user logs into another equipment item connected through a network, and the removal unit removes the given program from the program storing unit upon receiving the user ID of the individual user from said other equipment item.

* * * * *